United States Patent
Abnous et al.

(10) Patent No.: US 8,934,527 B2
(45) Date of Patent: Jan. 13, 2015

(54) ARCHITECTURE FOR VERY HIGH-SPEED DECISION FEEDBACK SEQUENCE ESTIMATION

(75) Inventors: Arthur Abnous, Irvine, CA (US); Avanindra Madisetti, Coto De Caza, CA (US); Christian A. J. Lutkemeyer, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 922 days.

(21) Appl. No.: 12/816,071

(22) Filed: Jun. 15, 2010

(65) Prior Publication Data

US 2010/0303144 A1    Dec. 2, 2010

Related U.S. Application Data

(63) Continuation of application No. 11/674,530, filed on Feb. 13, 2007, now Pat. No. 7,738,549, which is a continuation of application No. 09/804,082, filed on Mar. 12, 2001, now Pat. No. 7,177,353.

(60) Provisional application No. 60/188,560, filed on Mar. 10, 2000.

(51) Int. Cl.
   *H03H 7/30*     (2006.01)
   *H03H 7/40*     (2006.01)
   *H03K 5/159*    (2006.01)
   *H04L 25/03*    (2006.01)
   *H04L 25/497*   (2006.01)

(52) U.S. Cl.
   CPC .... *H04L 25/03267* (2013.01); *H04L 25/03197* (2013.01); *H04L 25/497* (2013.01); *H04L 25/03235* (2013.01)

USPC .......................................... 375/233; 375/285

(58) Field of Classification Search
   USPC .......... 375/229–233, 262, 341, 285; 714/792, 714/794, 795
   See application file for complete search history.

(56) References Cited

U.S. PATENT DOCUMENTS

| | | |
|---|---|---|
| 4,489,418 A | 12/1984 | Mazo |
| 5,056,117 A | 10/1991 | Gitlin et al. |

(Continued)

FOREIGN PATENT DOCUMENTS

EP    0 889 612 A2    1/1999

OTHER PUBLICATIONS

International Search Report for PCT/US01/07719, filed Mar. 12, 2001, mailed Sep. 17, 2001.

(Continued)

*Primary Examiner* — Jean B Corrielus
(74) *Attorney, Agent, or Firm* — Oblon, Spivak, McClelland, Maier & Neustadt, L.L.P.

(57) ABSTRACT

A method for providing a next-cycle input sample from a decision feedback equalizer to a symbol decoder using look-ahead computations such that timing contention between the decision feedback equalizer and the symbol decoder is reduced. During a symbol period, a set of possible values is computed in the decision feedback equalizer and a set of path memory symbols is computed in the symbol decoder, the set of path memory symbols being based on a current input sample. During the same symbol period, one of the possible values is selected as the next-cycle input sample based on at least one of the next-cycle path memory symbols produced from the symbol decoder.

6 Claims, 22 Drawing Sheets

(56) References Cited

U.S. PATENT DOCUMENTS

| | | |
|---|---|---|
| 5,097,482 A | 3/1992 | Serizawa et al. |
| 5,243,624 A | 9/1993 | Paik et al. |
| 5,255,128 A | 10/1993 | Inoue et al. |
| 5,384,810 A | 1/1995 | Amrany |
| 5,497,398 A | 3/1996 | Tzannes et al. |
| 5,513,215 A | 4/1996 | Marchetto et al. |
| 5,559,835 A | 9/1996 | Betts |
| 5,577,068 A | 11/1996 | Bottomley et al. |
| 5,636,246 A | 6/1997 | Tzannes et al. |
| 5,715,280 A | 2/1998 | Sandberg et al. |
| 5,745,396 A | 4/1998 | Shanbhag |
| 5,757,855 A | 5/1998 | Strolle et al. |
| 5,822,143 A | 10/1998 | Cloke et al. |
| 5,870,433 A | 2/1999 | Huber et al. |
| 5,872,817 A * | 2/1999 | Wei ........................ 375/341 |
| 6,097,769 A | 8/2000 | Sayiner et al. |
| 6,240,133 B1 * | 5/2001 | Sommer et al. ........... 375/232 |
| 6,252,909 B1 | 6/2001 | Tzannes et al. |
| 6,307,884 B1 | 10/2001 | Du et al. |
| 6,337,890 B1 | 1/2002 | Maru |
| 6,366,613 B2 * | 4/2002 | Sommer et al. ........... 375/232 |
| 6,567,481 B1 | 5/2003 | Molnar |
| 6,636,525 B1 | 10/2003 | Davis |
| 6,856,655 B1 | 2/2005 | Garcia |

OTHER PUBLICATIONS

Japanese Patent (abstract) No. JP403250818A, Aug. 1991.

* cited by examiner

| | | | |
|---|---|---|---|
| Viterbi Input | S▢▢.▢▢▢ | S5.3 | |
| 1D Error | S▢▢.▢▢ | S4.2 | |
| 1D Error² | ▢.▢▢ | U3.2 | |
| 2D Distance² | ▢.▢▢ | U3.2 | |
| 4D Distance² | ▢▢.▢▢ | U4.2 | Before Min Select |
| 4D Distance² | ▢▢.▢▢ | U4.2 | After Min Select |

*FIG. 16*

| Error Values | 1D Distance² Values |
|---|---|
| 00.00 | 0.00 |
| 00.01 / 11.11 | 0.00 |
| 00.10 / 11.10 | 0.01 |
| 00.11 / 11.01 | 0.10 |
| 01.00 / 11.00 | 1.00 |

*FIG. 17*

| Viterbi Input | Decision X | Error X | Rounded Error X | Error X2 | Decision Y | Error Y | Rounded Error Y | Error Y2 |
|---|---|---|---|---|---|---|---|---|
| 01.111 | 001 | 00.111 | 01.00 | 1.00 | 010 | 11.111 | 00.00 | 0.00 |
| 01.110 | 001 | 00.110 | 00.11 | 0.10 | 010 | 11.110 | 11.11 | 0.00 |
| 01.101 | 001 | 00.101 | 00.11 | 0.10 | 010 | 11.101 | 11.11 | 0.00 |
| 01.100 | 001 | 00.100 | 00.10 | 0.01 | 010 | 11.100 | 11.10 | 0.01 |
| 01.011 | 001 | 00.011 | 00.10 | 0.01 | 010 | 11.011 | 11.10 | 0.01 |
| 01.010 | 001 | 00.010 | 00.01 | 0.00 | 010 | 11.010 | 11.01 | 0.10 |
| 01.001 | 001 | 00.001 | 00.01 | 0.00 | 010 | 11.001 | 11.01 | 0.10 |
| 01.000 | 001 | 00.000 | 00.00 | 0.00 | 010 | 11.000 | 11.00 | 1.00 |
| 00.111 | 001 | 11.111 | 00.00 | 0.00 | 000 | 00.111 | 01.00 | 1.00 |
| 00.110 | 001 | 11.110 | 11.11 | 0.00 | 000 | 00.110 | 00.11 | 0.10 |
| 00.101 | 001 | 11.101 | 11.11 | 0.00 | 000 | 00.101 | 00.11 | 0.10 |
| 00.100 | 001 | 11.100 | 11.10 | 0.01 | 000 | 00.100 | 00.10 | 0.01 |
| 00.011 | 001 | 11.011 | 11.10 | 0.01 | 000 | 00.011 | 00.10 | 0.01 |
| 00.010 | 001 | 11.010 | 11.01 | 0.10 | 000 | 00.010 | 00.01 | 0.00 |
| 00.001 | 001 | 11.001 | 11.01 | 0.10 | 000 | 00.001 | 00.01 | 0.00 |
| 00.000 | 001 | 11.000 | 11.00 | 1.00 | 000 | 00.000 | 00.00 | 0.00 |

FIG. 18A

| Viterbi Input | Decision X | Error X | Rounded Error X | Error X2 | Decision Y | Error Y | Rounded Error Y | Error Y2 |
|---|---|---|---|---|---|---|---|---|
| 11.111 | 111 | 00.111 | 01.00 | 1.00 | 000 | 11.111 | 00.00 | 0.00 |
| 11.110 | 111 | 00.110 | 00.11 | 0.10 | 000 | 11.110 | 11.11 | 0.00 |
| 11.101 | 111 | 00.101 | 00.11 | 0.10 | 000 | 11.101 | 11.11 | 0.00 |
| 11.100 | 111 | 00.100 | 00.10 | 0.01 | 000 | 11.100 | 11.10 | 0.01 |
| 11.011 | 111 | 00.011 | 00.10 | 0.01 | 000 | 11.011 | 11.10 | 0.01 |
| 11.010 | 111 | 00.010 | 00.01 | 0.00 | 000 | 11.010 | 11.01 | 0.10 |
| 11.001 | 111 | 00.001 | 00.01 | 0.00 | 000 | 11.001 | 11.01 | 0.10 |
| 11.000 | 111 | 00.000 | 00.00 | 0.00 | 000 | 11.000 | 11.00 | 1.00 |
| 10.111 | 111 | 11.111 | 00.00 | 0.00 | 110 | 00.111 | 01.00 | 1.00 |
| 10.110 | 111 | 11.110 | 11.11 | 0.00 | 110 | 00.110 | 00.11 | 0.10 |
| 10.101 | 111 | 11.101 | 11.11 | 0.00 | 110 | 00.101 | 00.11 | 0.10 |
| 10.100 | 111 | 11.100 | 11.10 | 0.01 | 110 | 00.100 | 00.10 | 0.01 |
| 10.011 | 111 | 11.011 | 11.10 | 0.01 | 110 | 00.011 | 00.10 | 0.01 |
| 10.010 | 111 | 11.010 | 11.01 | 0.10 | 110 | 00.010 | 00.01 | 0.00 |
| 10.001 | 111 | 11.001 | 11.01 | 0.10 | 110 | 00.001 | 00.01 | 0.00 |
| 10.000 | 111 | 11.000 | 11.00 | 1.00 | 110 | 00.000 | 00.00 | 0.00 |

FIG. 18B

ARCHITECTURE FOR VERY HIGH-SPEED DECISION FEEDBACK SEQUENCE ESTIMATION

CROSS-REFERENCE TO RELATED APPLICATIONS

The present application is a continuation of U.S. patent application Ser. No. 11/674,530, filed Feb. 13, 2007 (now U.S. Pat. No. 7,738,549), which is a continuation of U.S. patent application Ser. No. 09/804,082, filed Mar. 12, 2001 (now U.S. Pat. No. 7,177,353), which claims priority to provisional application Ser. No. 60/188,560, filed on Mar. 10, 2000.

BACKGROUND OF THE INVENTION

1. Field of the Invention

The present invention relates generally to methods and systems for decoding input signal samples in a high-speed communication system. More particularly, the invention relates to a method and a system for decoding the trellis code specified in the IEEE 802.3ab standard for Gigabit Ethernet (also called 1000BASE-T standard).

2. Description of Related Art

In recent years, local area network (LAN) applications have become more and more prevalent as a means for providing local interconnect between personal computer systems, work stations and servers. Because of the breadth of its installed base, the 10BASE-T implementation of Ethernet remains the most pervasive, if not the dominant, network technology for LANs. However, as the need to exchange information becomes more and more imperative, and as the scope and size of the information being exchanged increases, higher and higher speeds (greater bandwidth) are required from network interconnect technologies. Among the high-speed LAN technologies currently available, fast Ethernet, commonly termed 100BASE-T, has emerged as the clear technological choice. Fast Ethernet technology provides a smooth, non-disruptive evolution from the 10 megabit per second (Mbps} performance of 10BASE-T applications to the 100 Mbps performance of 100BASE-T. The growing use of 100BASE-T interconnections between servers and desktops is creating a definite need for an even higher speed network technology at the backbone and server level.

One of the more suitable solutions to this need has been proposed in the IEEE 802.3ab standard for gigabit Ethernet, also termed 1000BASE-T. Gigabit Ethernet is defined as able to provide 1 gigabit per second (Gbps) bandwidth in combination with the simplicity of an Ethernet architecture, at a lower cost than other technologies of comparable speed. Moreover, gigabit Ethernet offers a smooth, seamless upgrade path for present 10BASE-T or 100BASE-T Ethernet installations.

In order to obtain the requisite gigabit performance levels, gigabit Ethernet transceivers are interconnected with a multi-pair transmission channel architecture. In particular, transceivers are interconnected using four separate pairs of twisted Category-5 copper wires. Gigabit communication, in practice, involves the simultaneous, parallel transmission of information signals, with each signal conveying information at a rate of 250 megabits per second (Mb/s). Simultaneous, parallel transmission of four information signals over four twisted wire pairs poses substantial challenges to bidirectional communication transceivers, even though the data rate on anyone wire pair is "only" 250 Mbps.

In particular, the Gigabit Ethernet standard requires that digital information being processed for transmission be symbolically represented in accordance with a five-level pulse amplitude modulation scheme (PAM-5) and encoded in accordance with an 8-state Trellis coding methodology. Coded information is then communicated over a multi-dimensional parallel transmission channel to a designated receiver, where the original information must be extracted (demodulated) from a multi-level signal. In Gigabit Ethernet, it is important to note that it is the concatenation of signal samples received simultaneously on all four twisted pair lines of the channel that defines a symbol. Thus, demodulator/decoder architectures must be implemented with a degree of computational complexity that allows them to accommodate not only the "state width" of Trellis coded signals, but also the "dimensional depth" represented by the transmission channel.

Computational complexity is not the only challenge presented to modern gigabit capable communication devices. Perhaps, a greater challenge is that the complex computations required to process "deep" and "wide" signal representations must be performed in an extremely short period of time. For example, in gigabit applications, each of the four-dimensional signal samples, formed by the four signals received simultaneously over the four twisted wire pairs, must be efficiently decoded within a particular allocated symbol time window of about 8 nanoseconds.

Successfully accomplishing the multitude of sequential processing operations required to decode gigabit signal samples within an 8 nanosecond window requires that the switching capabilities of the integrated circuit technology from which the transceiver is constructed be pushed to almost its fundamental limits. If performed in conventional fashion, sequential signal processing operations necessary for signal decoding and demodulation would result in a propagation delay through the logic circuits that would exceed the clock period, rendering the transceiver circuit non-functional. Fundamentally, then, the challenge imposed by timing constraints must be addressed if gigabit Ethernet is to retain its viability and achieve the same reputation for accurate and robust operation enjoyed by its 10BASE•T and 100BASE-T siblings.

In addition to the challenges imposed by decoding and demodulating multilevel signal samples, transceiver systems must also be able to deal with intersymbol interference (ISI) introduced by transmission channel artifacts as well as by modulation and pulse shaping components in the transmission path of a remote transceiver system. During the demodulation and decoding process of Trellis coded information, ISI components introduced by either means must also be considered and compensated, further expanding the computational complexity and thus, system latency of the transceiver system. Without a transceiver system capable of efficient, high-speed signal decoding as well as simultaneous ISI compensation, gigabit Ethernet would likely not remain a viable concept.

SUMMARY OF THE INVENTION

The present invention provides a method for providing a next-cycle input sample from a decision feedback equalizer to a symbol decoder using look-ahead computations such that timing contention between the decision feedback equalizer and the symbol decoder is reduced. During a symbol period, a set of possible values is computed in the decision feedback equalizer and a set of path memory symbols is computed in the symbol decoder, the set of path memory symbols being based on a current input sample. During the same symbol period, one of the possible values is selected as the next-cycle input sample based on at least one of the next-cycle path memory symbols produced from the symbol decoder.

BRIEF DESCRIPTION OF THE DRAWINGS

These and other features, aspects and advantages of the present invention will be more fully understood when considered with respect to the following detailed description, appended claims and accompanying drawings, wherein:

FIG. 16 shows the word lengths used m one embodiment of this invention.

FIG. 17 shows an exemplary lookup table suitable for use in computing squared one-dimensional error terms.

FIGS. 18A and 18B are an exemplary look-up table which describes the computation of the decisions and squared errors for both the X and Y subsets directly from one component of the 4D Viterbi input of the 1D slicers of FIG. 7.

DETAILED DESCRIPTION OF THE INVENTION

Figure 1:
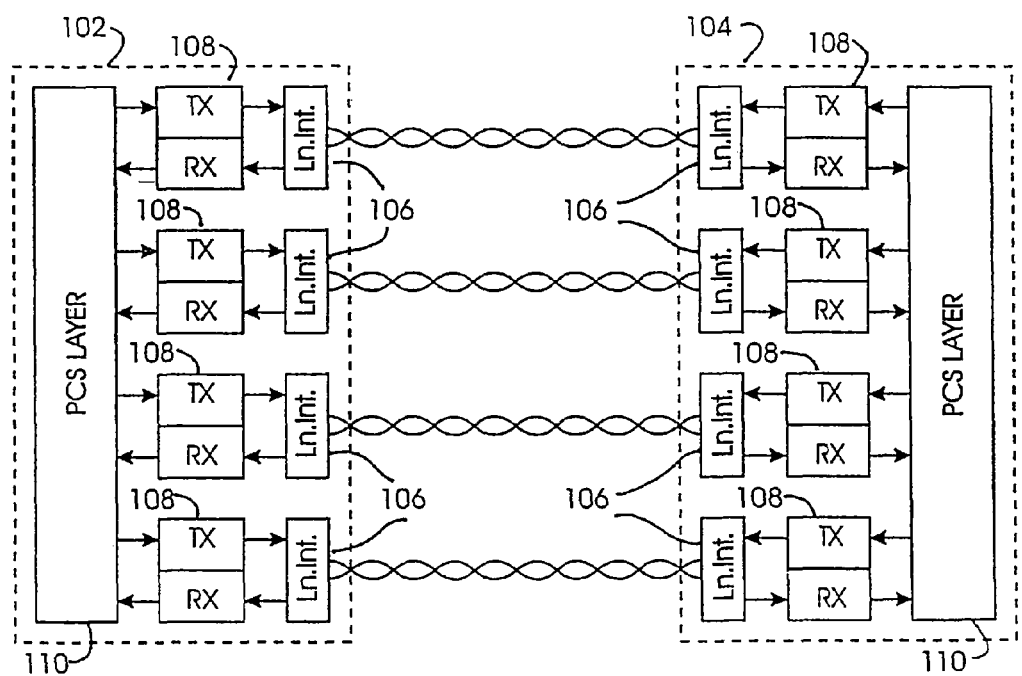
FIG. 1 is a simplified block diagram of a high-speed bidirectional communication system exemplified by two transceivers configured to communicate over multiple twisted-pair wiring channels.

In the context of an exemplary integrated circuit-type bidirectional communication system, the present invention might be characterized as a system and method for accommodating efficient, high speed decoding of signal samples encoded according to the trellis code specified in the IEEE 802.3ab standard (also termed 1000BASE-T standard).

As will be understood by one having skill in the art, high speed data transmission is often limited by the ability of decoder systems to quickly, accurately and effectively process a transmitted symbol within a given time period. In a 1000BASE-T application (aptly termed gigabit) for example, the symbol decode period is typically taken to be approximately 8 nanoseconds. Pertinent to any discussion of symbol decoding is the realization that 1000BASE.T systems are layered to receive 4-dimensional (4D) signals (each signal corresponding to a respective one of four twisted pair cables) with each of the 4-dimensional signals represented by five analog levels. Accordingly, the decoder circuitry portions of transceiver demodulation blocks require a multiplicity of operational steps to be taken in order to effectively decode each symbol. Such a multiplicity of operations is computationally complex and often pushes the switching speeds of integrated circuit transistors which make up the computational blocks to their fundamental limits.

In accordance with the present invention, a transceiver decoder is able to substantially reduce the computational complexity of symbol decoding, and thus avoid substantial amounts of propagation delay (i.e., increase operational speed), by making use of truncated (or partial) representations of various quantities that make up the decoding/ISI compensation process.

Sample slicing is performed in a manner such that one-dimensional (1D) square error terms are developed in a representation having, at most, three bits if the terms signify a Euclidian distance, and one bit if the terms signify a Hamming distance. Truncated 1D error term representation significantly reduces subsequent error processing complexity because of the fewer number of bits.

Likewise, ISI compensation of sample signals, prior to Viterbi decoding, is performed in a DFE, operatively responsive to tentative decisions made by the Viterbi. Use of tentative decisions, instead of a Viterbi's final decision, reduces system latency by a factor directly related to the path memory sequence distance between the tentative decision used, and the final decision, i.e., if there are N steps in the path memory from input to final decision output, and latency is a function of N, forcing the DFE with a tentative decision at step N-6 causes latency to become a function of N-6. A trade-off between accuracy and latency reduction may be made by choosing a tentative decision step either closer to the final decision point or closer to the initial point.

Computations associated with removing impairments due to intersymbol interference (ISI) are substantially simplified, in accordance with the present invention, by a combination of techniques that involves the recognition that intersymbol interference results from two primary causes, a partial response pulse shaping filter in a transmitter and from the characteristics of an unshielded twisted pair transmission channel. During the initial start-up, ISI impairments are processed in independent portions of electronic circuitry, with ISI caused by a partial response pulse shaping filter being compensated in an inverse partial response filter in a feedforward equalizer (FFE) at system startup, and ISI caused by transmission channel characteristics compensated by a decision feedback equalizer (DFE) operating in conjunction with a multiple decision feedback equalizer (MDFE) stage to provide ISI pre-compensated signals (representing a symbol) to a decoder stage for symbolic decoding. Performing the computations necessary for ISI cancellation in a bifurcated manner allows for fast DFE convergence as well as assists a transceiver in achieving fast acquisition in a robust and reliable manner. After the start-up, all ISI is compensated by the combination of the DFE and MDFE.

In order to appreciate the advantages of the present invention, it will be beneficial to describe the invention in the context of an exemplary bidirectional communication device, such as a gigabit Ethernet transceiver. The particular exemplary implementation chosen is depicted in FIG. 1, which is a simplified block diagram of a multi-pair communication system operating in conformance with the IEEE 802.3ab standard for one gigabit (Gb/s) Ethernet full-duplex communication over four twisted pairs of Category-5 copper wires.

The communication system illustrated in FIG. 1 is represented as a point-to-point system, in order to simplify the explanation, and includes two main transceiver blocks 102 and 104, coupled together with four twisted-pair cables. Each of the wire pairs is coupled between the transceiver blocks through a respective one of four line interface circuits 106 and communicate information developed by respective ones of four transmitter/receiver circuits (constituent transceivers) 108 coupled between respective interface circuits and a physical coding sublayer (PCS) block 110. Four constituent transceivers 108 are capable of operating simultaneously at 250 megabits per second (Mb/s), and are coupled through respective interface circuits to facilitate full-duplex bidirectional operation. Thus, one Gb/s communication throughput of each of the transceiver blocks 102 and 104 is achieved by using four 250 Mb/s (125 megabaud at 2 bits per symbol) constituent transceivers 108 for each of the transceiver blocks and four twisted pairs of copper cables to connect the two transceivers together.

The exemplary communication system of FIG. 1 has a superficial resemblance to a 100BASE-T4 system, but is configured to operate at 10 times the bit rate. As such, it should be understood that certain system performance characteristics, such as sampling rates and the like, will be consequently higher causing lengthy and complex computations to be performed during increasingly shorter periods of time. At gigabit data rates over potentially noisy channels, a proportionately greater degree of signal processing is required in many instances to ensure an adequate degree of signal fidelity and quality.

Figure 2:
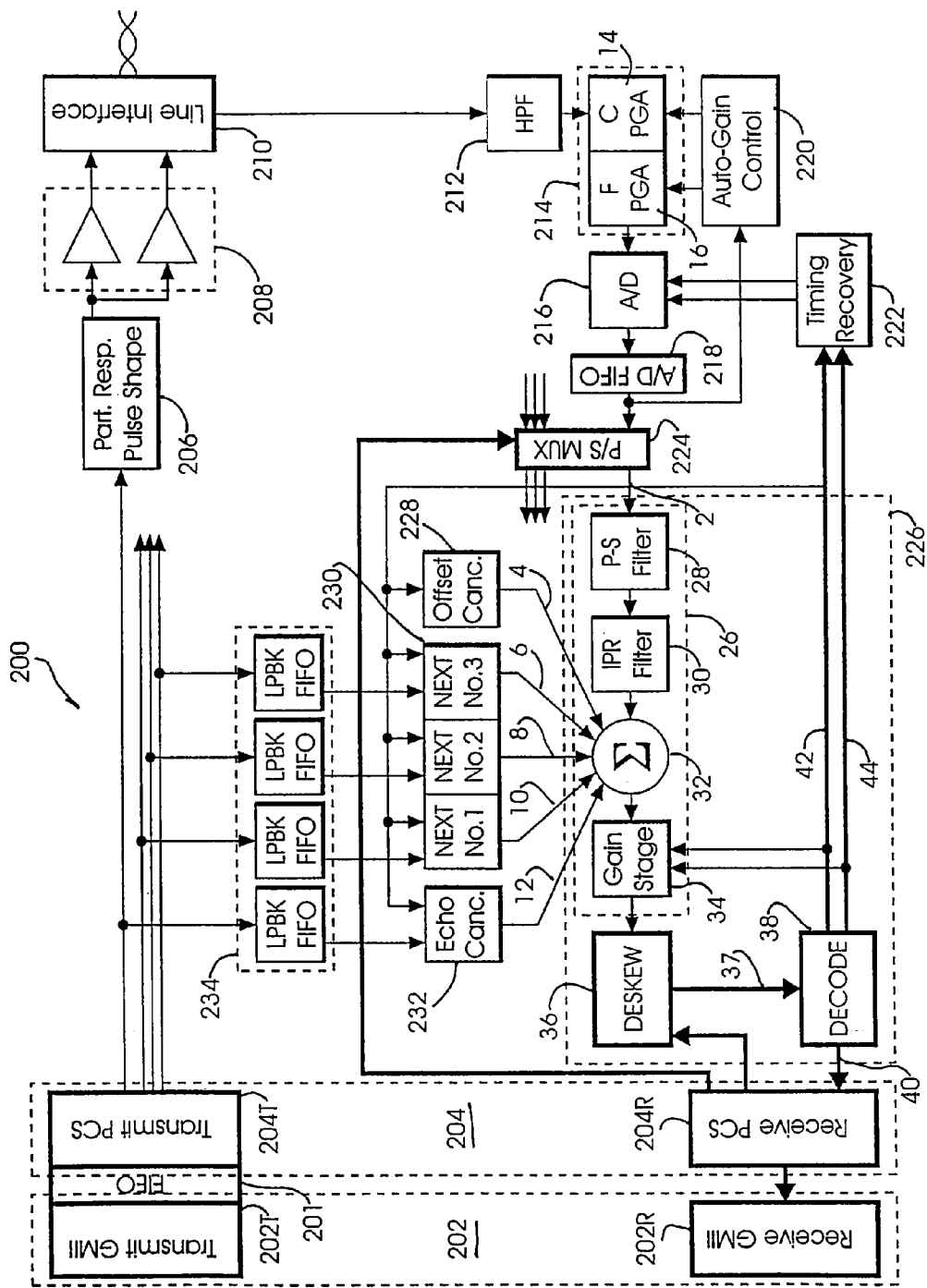
FIG. 2 is a simplified block diagram of a bidirectional communication transceiver system, constructed in accordance with the present invention.

FIG. 2 is a simplified block diagram of the functional architecture and internal construction of an exemplary transceiver block, indicated generally at 200, such as transceiver 102 of FIG. 1. Since the illustrated transceiver application relates to gigabit Ethernet transmission, the transceiver will be referred to as the "gigabit transceiver". For ease of illustration and description, FIG. 2 shows only one of the four 250 Mb/s constituent transceivers which are operating simultaneously (termed herein 4-D operation). However, since the operation of the four constituent transceivers are necessarily interrelated, certain blocks in the signal lines in the exemplary embodiment of FIG. 2 perform and carry 4-dimensional (4-D) functions and 4-D signals, respectively. By 4-D, it is meant that the data from the four constituent transceivers are used simultaneously. In order to clarify signal relationships in FIG. 2, thin lines correspond to 1-dimensional functions or signals (i.e.; relating to only a single transceiver), and thick lines correspond to 4-D functions or signals (relating to all four transceivers).

With reference to FIG. 2, the gigabit transceiver 200 includes a Gigabit Medium Independent Interface (GMII) block 202, a Physical Coding Sublayer (PCS) block 204, a pulse shaping filter 206, a digital-to-analog (D/A) converter 208, a line interface block 210, a highpass filter 212, a programmable gain amplifier (PGA) 214, an analog-to-digital (AID) converter 216, an automatic gain control block 220, a timing recovery block 222, a pair-swap multiplexer block 224, a demodulator 226, an offset canceller 228, a near-end crosstalk (NEXT) canceler block 230 having three NEXT cancelers, and an echo canceler 232. The gigabit transceiver 200 also includes an AID first-in-first-out buffer (FIFO) 218 to facilitate proper transfer of data from the analog clock region to the receive clock region, and a FIFO block 234 to facilitate proper transfer of data from the transmit clock region to the receive clock region. The gigabit transceiver 200 can optionally include a filter to cancel far-end crosstalk noise (FEXT canceler).

On the transmit path, the transmit section of the GMII block 202 receives data from a Media Access Control (MAC) module (not shown in FIG. 2) and passes the digital data to the transmit section 204T of the PCS block 204 via a FIFO 201 in byte-wide format at the rate of 125 MHz. The FIFO 201 is essentially a synchronization buffer device and is provided to ensure proper data transfer from the MAC layer to the Physical Coding (PHY) layer, since the transmit clock of the PRY layer is not necessarily synchronized with the clock of the MAC layer. This small FIFO 201 can be constructed with from three to five memory cells to accommodate the elasticity requirement which is a function of frame size and frequency offset.

The transmit section 204T of the PCS block 204 performs scrambling and coding of the data and other control functions. Transmit section 204T of the PCS block 204 generates four 1D symbols, one for each of the four constituent transceivers. The 1D symbol generated for the constituent transceiver depicted in FIG. 2 is filtered by a partial response pulse shaping filter 20G so that the radiated emission of the output of the transceiver may fall within the EMI requirements of the Federal Communications Commission. The pulse shaping filter 206 is constructed with a transfer function $0.75+0.25\ z^{-1}$, such that the power spectrum of the output of the transceiver falls below the power spectrum of a 100Base-Tx signal. The 100Base-Tx is a widely used and accepted Fast Ethernet standard for 100 Mb/s operation on two pairs of category-5 twisted pair cables. The output of the pulse shaping filter 206 is converted to an analog signal by the D/A converter 208 operating at 125 MHz. The analog signal passes through the line interface block 210, and is placed on the corresponding twisted pair cable for communication to a remote receiver.

On the receive path, the line interface block 210 receives an analog signal from the twisted pair cable. The received analog signal is preconditioned by a highpass filter 212 and a programmable gain amplifier (PGA) 214 before being converted to a digital signal by the A/D converter 216 operating at a sampling rate of 125 MHz. Sample timing of the A/D converter 216 is controlled by the output of a timing recovery block 222 controlled, in turn, by decision and error signals from a demodulator 226. The resultant digital signal is properly transferred from the analog clock region to the receive clock region by an A/D FIFO 218, an output of which is also used by an automatic gain control circuit 220 to control the operation of the PGA 214.

The output of the A/D FIFO 218, along with the outputs from the A/D FIFOs of the other three constituent transceivers are inputted to a pair-swap multiplexer block 224. The pair-swap multiplexer block 224 is operatively responsive to a 4D pair-swap control signal, asserted by the receive section 204R of PCS block 204, to sort out the 4 input signals and send the correct signals to the respective demodulators of the 4 constituent transceivers. Since the coding scheme used for the gigabit transceivers 102, 104 (referring to FIG. 1) is based on the fact that each twisted pair of wire corresponds to a 1D constellation, and that the four twisted pairs, collectively, form a 4D constellation, for symbol decoding to function properly, each of the four twisted pairs must be uniquely identified with one of the four dimensions. Any undetected swapping of the four pairs would necessarily result in erroneous decoding. Although described as performed by the receive section 204R of PCS block 204 and the pair-swap multiplexer block 224, in the exemplary embodiment of FIG. 2, the pair-swapping control might alternatively be performed by the demodulator 226.

Demodulator 226 receives the particular received signal 2 intended for it from the pair-swap multiplexer block 224, and functions to demodulate and decode the signal prior to directing the decoded symbols to the PCS layer 204 for transfer to the MAC. The demodulator 226 includes a feedforward equalizer (FFE) 26, a de-skew memory circuit 36 and a trellis decoder 38. The FFE 26 includes a pulse shaping filter 28, a programmable inverse partial response (IPR) filter 30, a summing device 32, and an adaptive gain stage 34. Functionally, the FFE 26 may be characterized as a least-mean-squares (LMS) type adaptive filter which performs channel equalization as described in the following.

Pulse shaping filter 28 is coupled to receive an input signal 2 from the pair swap MUX 224 and functions to generate a precursor to the input signal 2. Used for timing recovery, the precursor might be described as a zero-crossing indicator inserted at a precursor position of the signal. Such a zero-crossing assists a timing recovery circuit in determining phase relationships between signals, by giving the timing recovery circuit an accurately determinable signal transition point for use as a reference. The pulse shaping filter 28 can be placed anywhere before the decoder block 38. In the exemplary embodiment of FIG. 2, the pulse shaping filter 28 is positioned at the input of the FFE 26.

The pulse shaping filter 28 transfer function may be represented by a function of the form $-\gamma + z^{-1}$, with $\gamma$ equal to $\frac{1}{16}$ for short cables (less than 80 meters) and $\frac{1}{8}$ for long cables (more than 80 m). The determination of the length of a cable is based on the gain of the coarse PGA section 14 of the PGA 214.

A programmable inverse partial response (IPR) filter 30 is coupled to receive the output of the pulse shaping filter 28, and functions to compensate the ISI introduced by the partial response pulse shaping in the transmitter section of the remote transceiver which transmitted the analog equivalent of the digital signal 2. The IPR filter 30 transfer function may be represented by a function of the form $1/(1+Kz^{-1})$ and may also be described as dynamic. In particular, the filter's K value is dynamically varied from an initial non-zero setting, valid at system start-up, to a final setting. K may take any positive value strictly less than 1. In the illustrated embodiment, K might take on a value of about 0.484375 during startup, and be dynamically ramped down to zero after convergence of the decision feedback equalizer included inside, the trellis decoder 38.

The foregoing is particularly advantageous in high-speed data recovery systems, since by compensating the transmitter induced ISI at start-up, prior to decoding, it reduces the amount of processing required by the decoder to that required only for compensating transmission channel induced ISI. This "bifurcated" or divided ISI compensation process allows for fast acquisition in a robust and reliable manner. After DFE convergence, noise enhancement in the feedforward equalizer 26 is avoided by dynamically ramping the feedback gain factor K of the IPR filter 30 to zero, effectively removing the filter from the active computational path.

A summing device 32 subtracts from the output of the IPR filter 30 the signals received from the offset canceler 228, the NEXT cancelers 230, and the echo canceler 232. The offset canceler 228 is an adaptive filter which generates an estimate of the offset introduced at the analog front end which includes the PGA 214 and the ND converter 216. Likewise, the three NEXT cancelers 230 are adaptive filters used for modeling the NEXT impairments in the received signal caused by the symbols sent by the three local transmitters of the other three constituent transceivers. The impairments are due to a near-end crosstalk mechanism between the pairs of cables. Since each receiver has access to the data transmitted by the other three local transmitters, it is possible to nearly replicate the NEXT impairments through filtering. Referring to FIG. 2, the three NEXT cancelers 230 filter the signals sent by the PCS block 204 to the other three local transmitters and produce three signals replicating the respective NEXT impairments. By subtracting these three signals from the output of the IPR filter 30, the NEXT impairments are approximately canceled.

Due to the bi-directional nature of the channel, each local transmitter causes an echo impairment on the received signal of the local receiver with which it is paired to form a constituent transceiver. The echo canceler 232 is an adaptive filter used for modeling the echo impairment. The echo canceler 232 filters the signal sent by the PCS block 204 to the local transmitter associated with the receiver, and produces a replica of the echo impairment. By subtracting this replica signal from the output of the IPR filter 30, the echo impairment is approximately canceled.

Following NEXT, echo and offset cancellation, the signal is coupled to an adaptive gain stage 34 which functions to fine tune the gain of the signal path using a zero-forcing LMS algorithm. Since this adaptive gain stage 34 trains on the basis of errors of the adaptive offset, NEXT and echo cancellation filters 228, 230 and 232 respectively, it provides a more accurate signal gain than the PGA 214.

The output of the adaptive gain stage 34, which is also the output of the FFE 26, is inputted to a de-skew memory 36. The de-skew memory 36 is a four-dimensional function block, i.e., it also receives the outputs of the three FFEs of the other three constituent transceivers as well as the output of FFE 26 illustrated in FIG. 2. There may be a relative skew in the outputs of the 4 FFEs, which are the 4 signal samples representing the 4 symbols to be decoded. This relative skew can be up to 50 nanoseconds, and is due to the variations in the way the copper wire pairs are twisted. In order to correctly decode the four symbols, the four signal samples must be properly aligned. The de-skew memory is responsive to a 4D de-skew control signal asserted by the PCS block 204 to de-skew and align the four signal samples received from the four FFEs. The four de-skewed signal samples are then directed to the trellis decoder 38 for decoding.

Data received at the local transceiver was encoded, prior to transmission by a remote transceiver, using an 8-state four-dimensional trellis code. In the absence of inter-symbol interference (ISI), a proper 8-state Viterbi decoder would provide optimal decoding of this code. However, in the case of Gigabit Ethernet, the Category-5 twisted pair cable introduces a significant amount of ISI. In addition, as was described above in connection with the FFE stage 26, the partial response filter of the remote transmitter on the other end of the communication channel also contributes a certain component of ISI. Therefore, during nominal operation, the trellis decoder 38 must decode both the trellis code and compensate for at least transmission channel induced ISI, at a substantially high computational rate, corresponding to a symbol rate of about 125 Mhz.

In the illustrated embodiment of the gigabit transceiver of FIG. 2, the trellis decoder 38 suitably includes an 8-state Viterbi decoder for symbol decoding, and incorporates circuitry which implements a decision-feedback sequence estimation approach in order to compensate the ISI components perturbing the signal which represents transmitted symbols. The 4D output 40 of the trellis decoder 38 is provided to the receive section 204R of the PCS block. The receive section 204R of PCS block de-scrambles and further decodes the symbol stream and then passes the decoded packets and idle stream to the receive section of the GMII block 202 for transfer to the MAC module.

The 4D outputs 42 and 44, which represent the error and tentative decision signals defined by the decoder, respectively, are provided to the timing recovery block 222, whose output controls the sampling time of the A/D converter 216. One of the four components of the error 42 and one of the four components of the tentative decision 44 correspond to the signal stream pertinent to the particular receiver section, illustrated in FIG. 2, and are provided to the adaptive gain stage 34 to adjust the gain of the signal path.

The component 42A of the 4D error 42, which corresponds to the receiver shown in FIG. 2, is further provided to the adaptation circuitry of each of the adaptive offset, NEXT and echo cancellation filters 228, 230, 232. During startup, adaptation circuitry uses the error component to train the filter coefficients. During normal operation, adaptation circuitry uses the error component to periodically update the filter coefficients.

As described briefly above, the demodulator 226 includes the feedforward equalizer (FFE) 26, the de-skew memory 36 and the trellis decoder 38.

In one embodiment the FFE 26 includes a precursor filter 28, an inverse partial response filter 30, a noise cancellation stage, 32 and a gain stage 34.

The precursor filter 28, also called precursor pulse shaping filter, generates a precursor to the input signal 2. This precursor, which is preferably a zero-crossing indicator preceding each sample in the input signal 2, is used for timing recovery by the timing recover module 222 (FIG. 2). The precursor filter 28 is a non-adaptive filter. For ease of implementation and high-speed operation, the precursor filter 28 is preferably a finite impulse response filter having a transfer function of the form $-\gamma+z^{-1}$, with $\gamma$ equal to $\frac{1}{16}$ for short cables (less than 80 meters) and $\frac{1}{8}$ for long cables (more than 80 m). The determination of the length of a cable is based on the gain of the coarse PGA 14 of the PGA block 214.

The precursor filter 28 includes a finite impulse response (FIR) filter. In one embodiment of the present invention, the precursor filter 28 also includes a multiplexer and a register. The FIR filter includes a register, a multiplier and an adder. The registers, i.e., the delay elements, are denoted conventionally by $z^{-1}$. The transfer function of the FIR filter may be expressed as $-\gamma+z^{-1}$ where $\gamma$ is a programmable constant inputted into the FIR filter via the multiplier. The output $\gamma_1$ at time sample n of the FIR filter can be expressed in terms of the input sequence x (i.e., the signal 2 outputted from the pair swap multiplexers 224) as $\gamma_1(n)=-\gamma x(n)+x(n-1)$.

In this embodiment, the multiplexer provides a value of $\gamma$ to the FIR filter. This value can be either $\frac{1}{16}$ or $\frac{1}{8}$, and is selected based on the signal received at the multiplexer select input. This signal is the output of the register. The register has two inputs. The first input is derived from the coarse AGC gain output of the AGC 220 (FIG. 2) which is provided to the coarse PGA 14. As implemented in one embodiment, the coarse AGC gain is an unsigned four-bit number. The first input is equal to the most significant bit of the coarse AGC gain. Specifically, the first input is obtained by shifting the coarse AGC gain to the right by three bits and logically AND-ing the shifted word with 1. The second input of the register allows the value of the first input to be loaded into the register. This value is then used by the MUX to select either $\frac{1}{16}$ or $\frac{1}{8}$ as output. The value $\frac{1}{16}$ is selected when the value of the output of the register indicates that the cable connecting the local transceiver to the remote transceiver is short (less than eighty meters). The value $\frac{1}{8}$ is selected when the value of the output of the register indicates that the cable connecting the local transceiver to the remote transceiver is long (equal or greater than eighty meters).

The precursor filter 28 preferably includes a register to store the output of the FIR filter and to provide this output to the IPR filter 30 at the next clock pulse. The register prevents any computational delay at the adder of the FIR filter from propagating to the adder of the IPR filter 30. Without this register, the concatenation of the two adders may cause a combined computational delay that could exceed a clock period, and this may result in computational errors.

The programmable IPR filter 30 compensates the ISI introduced by the partial response pulse shaping filter (identical to filter 206 of FIG. 2) in the transmitter of the remote transceiver which transmitted the analog equivalent of the digital signal 2. The IPR filter 30 is preferably a infinite impulse response filter having a transfer function of the form $1/(1+Kz^{-1})$. In one embodiment, K is 0.484375 during the startup of the constituent transceiver, and is slowly ramped down to zero after convergence of the decision feedback equalizer (DFE) 612 (FIGS. 6 and 15) which resides inside the trellis decoder 38 (FIG. 2). K may be any positive number strictly less than 1. The transfer function $1/(1+Kz^{-1})$ is approximately the inverse of the transfer function of the partial response pulse shaping filter 206 (FIG. 2) which is $0.75+0.25 z^{-1}$ to compensate the ISI introduced by the partial response pulse shaping filter (identical to the filter 206 of FIG. 2) included in the transmitter of the remote transceiver.

During the startup of the local constituent transceiver, the DFE 612 (FIGS. 6 and 15) must be trained until its coefficients converge. The training process may be performed with a least mean squares (LMS) algorithm. Conventionally, the LMS algorithm is used with a known sequence for training. However, in one embodiment of the gigabit Ethernet transceiver depicted in FIG. 2, the DFE 612 is not trained with a known sequence, but with an unknown sequence of decisions outputted from the decoder block 1502 (FIG. 15) of the trellis decoder 38 (FIG. 2). In order to converge, the DFE 612 must correctly output an estimate of the ISI present in the incoming signal samples based on the sequence of past decisions. This ISI represents interference from past data symbols, and is commonly termed postcursor ISI. After convergence of the DFE 612, the DFE 612 can accurately estimate the postcursor ISI.

It is noted that the twisted pair cable response is close to a minimum-phase response. It is well-known in the art that when the channel has minimum phase response, there is no precursor ISI, i.e., interference from future symbols. Thus, in the case of the gigabit Ethernet communication system, the precursor ISI is negligible. Therefore, there is no need to compensate for the precursor ISI.

At startup, without the programmable IPR filter 30, the DFE would have to compensate for both the postcursor ISI and the ISI introduced by the partial response pulse shaping filter in the remote transmitter. This would cause slow and difficult convergence for the DFE 612. Thus, by compensating for the ISI introduced by the partial response pulse shaping filter in the remote transmitter, the programmable IPR filter 30 helps speed up the convergence of the DFE 612. However, the programmable IPR filter 30 may introduce noise enhancement if it is kept active for a long time. "Noise enhancement" means that noise is amplified more than the signal, resulting in a decrease of the signal-to-noise ratio. To prevent noise enhancement, after startup, the programmable IPR filter 30 is slowly deactivated by gradually changing the transfer function from $1/(1+Kz^{-1})$ to 1. This is done by slowly ramping K down to zero. This does not affect the function of the DFE 612, since, after convergence, the DFE 612 can easily compensate for both the postcursor ISI and the ISI introduced by the partial response pulse shaping filter.

In one embodiment discussed above, the programmable IPR filter 30 includes an adder, a register and a multiplier. The adder combines the output of the precursor filter 28 with a scaled feedback signal from the output of the IPR filter 30. The scale factor is −K, and is provided by a control signal FFEK. This scale factor is programmable, as previously mentioned. The multiplier multiplies the scale factor with the feedback output of the IPR 30. The transfer function of the IPR 30, as shown, is $z^{-1}/(1+Kz^{-1})$. The transfer function would be $1/(1+Kz^{-1})$ if the register is placed on the feedback path instead of the forward path of the filter 30. It is placed on the forward path to prevent any computational delay at the adder from propagating to the downstream adder.

The noise cancellation stage 32 includes an adder and a register. The adder subtracts from the output signal of the IPR filter 30 the noise signals 4, 6, 8, 10, 12 received from the offset canceller 228, NEXT cancellers 230 and echo canceller 232 (FIG. 2). Thus, the output of the adder is a noise-reduced filtered signal. This output is stored in the register and outputted to the gain stage 34 at the next clock pulse.

The gain stage 34 uses a zero-forcing least-mean-squares algorithm to fine-tune the gain of the signal path. The gain stage 34 includes a multiplier and an adaptation circuit. The multiplier scales the output of the noise cancellation stage 32 by the output of the adaptation circuit. Thus, the gain stage 34 adjusts the amplitude of the received signal. This adjustment provides the adjustment of the gain of the feedforward equalizer 26. The gain stage 34 adjusts the amplitude of the received signal so that it fits in the operational range of the trellis decoder 38 (FIG. 2). This ensures proper operation of the slicer inside the trellis decoder 38 (FIG. 2).

The adaptation circuit includes a multiplier, an adder and a register. The inputs to the multiplier are a 1D component of the tentative decision 44 (FIG. 2) and a 1D component of the slicer error 42 (FIG. 2). The product of these two inputs is shifted to the right by 2 bits. This the signal $\mu=2^{-2}$. Since the 1D symbols are from the PAM-5 alphabet, the 1D component of the tentative decision 44 can only be −2, −1, 0, 1, 2. The rounded value slicer error can only be 0 or 1. Thus, the multiplier is actually not a real multiplier.

The adaptation circuit is updated based on a scaled product of the tentative decision and the slicer error. Since the error is also provided to the noise cancellers 228, 230, 232 (FIG. 2), the adaptation circuit 154 is trained on the basis of the error provided to the noise cancellers 228, 230, 232. This allows the adaptation circuit to provide a more accurate gain for the signal path than the PGA 14 (FIG. 2).

The control signal DFEFRZ, when applied, freezes the LMS update of the FFE gain. When it is applied, the register content remains unchanged. The control signal DFERST resets the FFE gain to a value that is decoded from the coarse AGC 220 (FIG. 2) gain. When it is applied, the register content is set to that value.

The output of the gain stage is buffered and delayed by two time periods (two clock pulses) in a register then outputted.

The FFE 26 as described above has several novel features and advantages over a traditional FFE. A traditional FFE includes adaptive finite impulse response filter to filter the signal. The disadvantage or using an adaptive filter in a FFE is that it interacts with the timing recovery module, thus may not converge properly. If it is not trained properly, it may become a high pass filter which would amplify noise. Although it is possible to train the adaptive filter properly to be an allpass filter to have phase equalization, this requires much more complicated implementation.

Unlike a traditional FFE which uses adaptive filters for filtering the received signal, the FFE of the present invention uses only non-adaptive filters to filter the signal (it is noted that the adaptation circuit in the gain stage does not filter the received signal). Since the fixed filters are fixed, not adaptive in time, they do not interact with the timing recovery module 222 (FIG. 2). They do not change the phase, hence the pulse shape, of the received signal. Thus, they do not change the sampling phase setting of the timing recovery module 222.

As mentioned previously, the IPR filter is gradually deactivated after startup. Thus, the FFE 26 does not introduce noise enhancement. The FFE 26 also has simple circuitry that can be easily implemented.

Figure 15:
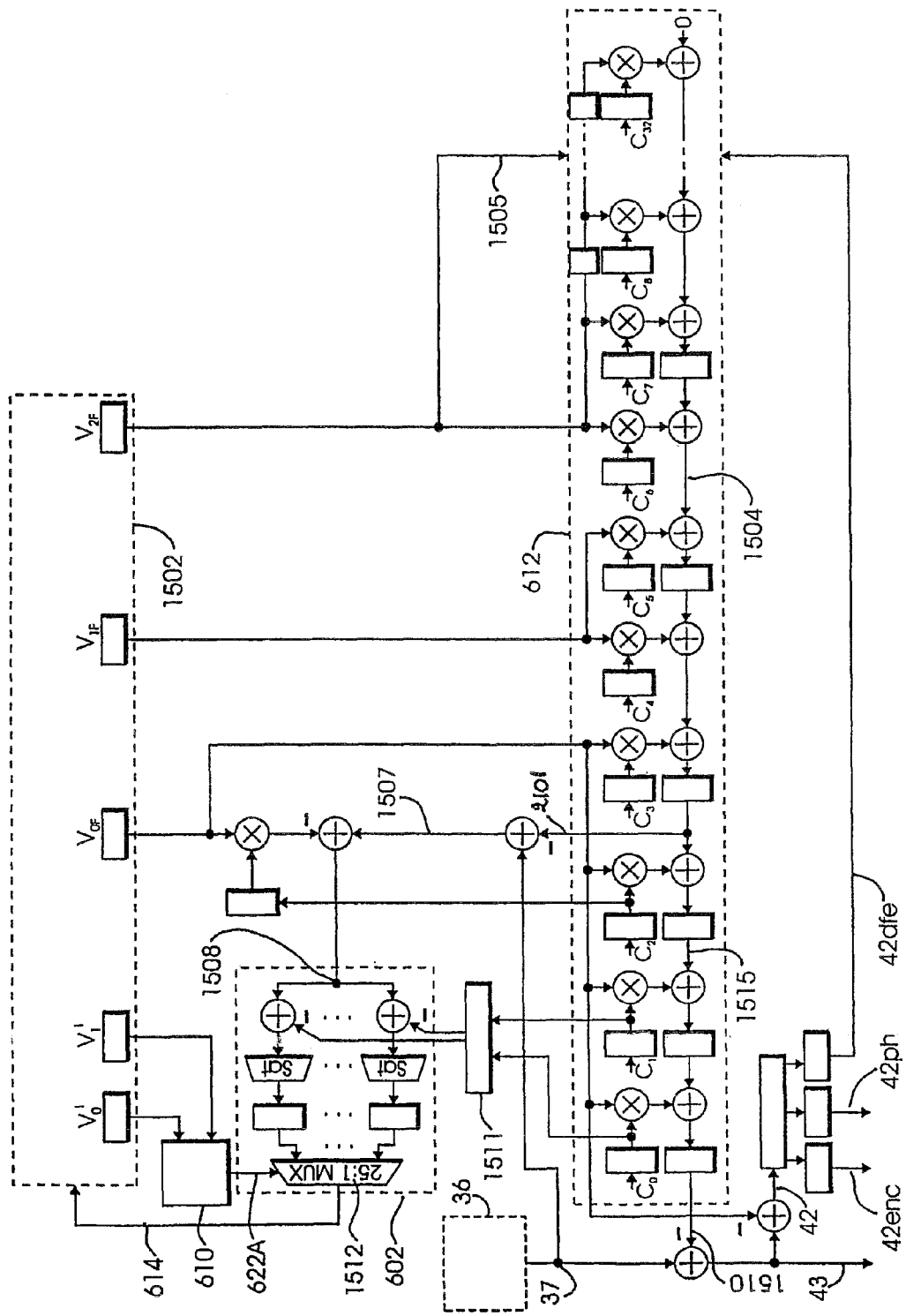
FIG. 15 is a detailed diagram illustrating the processing of the outputs $V_o^{(i)}$, $V_f^{(i)}$, with i=0, . . . , 7, and $V_{0F}$, $V_{1F}$, $V_{2F}$ of the path memory module of FIG. 6.

Another novel feature of the FFE 26 is that the noise cancellation stage 32 is placed before the adaptive gain stage 34. If the noise cancellation stage is placed after the gain stage, then the impulse responses of the cancellers 228, 230, 232 will be affected by the gain of the gain stage for the following reason. The coefficients of the cancellers are trained for certain gain value. When the gain changes, the coefficients of the cancellers are no longer correct and need to be retrained. Thus, because of this interaction between the gain stage and the cancellers, the startup will be unreliable. Therefore, the placement of the noise cancellation stage 32 before the gain stage 34 causes the feedback loop between the adaptive gain stage 34 and the cancellers 228, 230, 232 to be de-coupled. This in-turn allows the startup to be robust. When the echo, NEXT, and offset cancellation is done before the gain stage, as discussed above, the coefficients of the echo, NEXT and offset cancellers do not need to change in response to gain changes, as discussed previously. However, it is important to note that, unless special compensation logic is added, the gain of the LMS update algorithm for the cancellers would change. This in turn would cause the speed of convergence of the cancellers to change when the gain of the FFE changes. In some cases (when the gain of the FFE is large) it would even cause instabilities in the adaptation algorithm for the cancellers. To prevent this from happening, the cancellers are adapted using the "normalized adaptation error" 42$enc$ (FIG. 15) instead of the slicer error 42$ph$ (FIG. 15) or the adaptation error 42$dfe$ (FIG. 15). An exact normalization would require that the normalized adaptation error 42$enc$ be computed by dividing the adaptation error 42$dfe$ by the gain 161 of the gain stage 34. However a true divider circuit is complex and difficult to implement at high speed. Therefore, an approximate division is used to compute the normalized adaptation error 42$enc$. The approximate division is done using only the 4 most significant bits (MSBs) of the gain stage 34 (the gain is treated as a U13.8 quantity, i.e., an unsigned number having 13 bits with 8 bits after the decimal point). This approximate division is as follows:

| | |
|---|---|
| if the MSB =1 | Normalized Adaptation Error = Adaptation Error shifted to the right by 1 bit; |
| else if the $2^{nd}$ MSB = =1 | Normalized Adaptation Error = Adaptation Error; |
| else if the $3^{rd}$ MSB = = 1 | Normalized Adaptation Error = Adaptation Error shifted to the left by 1 bit; |
| else | Normalized Adaptation Error = Adaptation Error shifted to the left by 2 bits. |

As implemented in the exemplary Ethernet gigabit transceiver, the trellis decoder 38 functions to decode symbols that have been encoded in accordance with the trellis code specified in the IEEE 802.3ab standard (1000BASE-T, or gigabit). As mentioned above, information signals are communicated between transceivers at a symbol rate of about 125 MHz, on each of the pairs of twisted copper cables that make up the transmission channel. In accordance with established Ethernet communication protocols, information signals are modulated for transmission in accordance with a 5-level Pulse Amplitude Modulation (PAM-5) modulation scheme. Thus, since five amplitude levels represent information signals, it is understood that symbols can be expressed in a three bit representation on each twisted wire pair.

Figures 3, 4A, 4B:
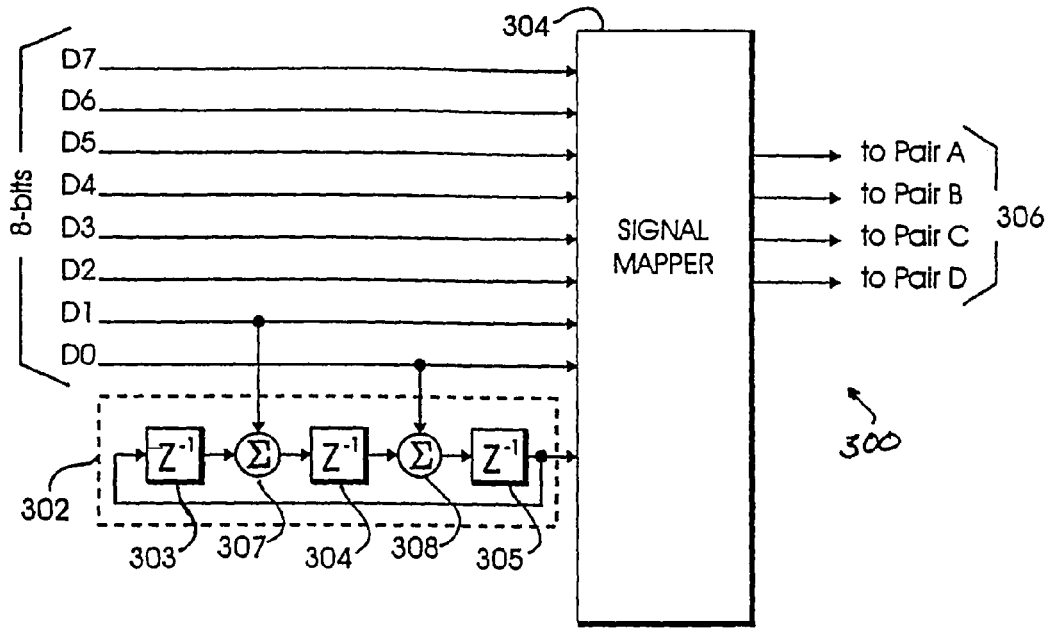
FIG. 3 is a simplified block diagram of an exemplary trellis encoder.
FIG. 4A illustrates an exemplary PAM-5 constellation and the one-dimensional symbol-subset partitioning.
FIG. 4B illustrates the eight 4D code-subsets constructed from the one-dimensional symbol-subset partitioning of the constellation of FIG. 4A.

FIG. 4A depicts an exemplary PAM-5 constellation and the one-dimensional symbol subset partitioning within the PAM-5 constellation. As illustrated in FIG. 4A, the constellation is a representation of five amplitude levels, +2, +1, 0, −1, −2, in decreasing order. Symbol subset partitioning occurs by dividing the five levels into two ID subsets, X and Y, and assigning X and Y subset designations to the five levels on an alternating basis. Thus +2, 0 and −2 are assigned to the Y subset; +1 and −1 are assigned to the X subset. The partitioning could, of course, be reversed, with +1 and −I being assigned a Y designation.

It should be recognized that although the X and Y subsets represent different absolute amplitude levels, the vector distance between neighboring amplitudes within the subsets are the same, i.e., two (2). The X subset therefore includes amplitude level designations which differ by a value of two, (−1, +1), as does the Y subset (−2, 0, +2). This partitioning offers certain advantages to slicer circuitry in a decoder, as will be developed further below.

In FIG. 4B, the 1D subsets have been combined into 4D subsets representing the four twisted pairs of the transmission channel. Since 1D subset definition is binary (X:Y) and there are four wire pairs, there are sixteen possible combinations of 4D subsets. These sixteen possible combinations are assigned into eight 4D subsets, s0 to s7 inclusive, in accordance with a trellis coding scheme. Each of the 4D subsets (also termed code subsets) are constructed of a union of two complementary 4D sub-subsets, e.g., code-subset three (identified as s3) is the union of sub-subset X:X:Y:X and its complementary image Y:Y:X:Y.

Data being processed for transmission is encoded using the above described 4-dimensional (4D) 8-state trellis code, in an encoder circuit, such as illustrated in the exemplary block diagram of FIG. 3, according to an encoding algorithm specified in the 1000BASE-T standard.

FIG. 3 illustrates an exemplary encoder 300, which is commonly provided in the transmit PCS portion of a gigabit transceiver. The encoder 300 is represented in simplified form as a convolutional encoder 302 in combination with a signal mapper 304. Data received by the transmit PCS from the MAC module via the transmit gigabit medium independent interface are encoded with control data and scrambled, resulting in an eight bit data word represented by input bits $D_0$ through $D_7$ which are introduced to the signal mapper 304 of the encoder 300 at a data rate of about 125 MHz. The two least significant bits, $D_0$ and $D_1$, are also inputted, in parallel fashion, into a convolutional encoder 302, implemented as a linear feedback shift register, in order to generate a redundancy bit C which is a necessary condition for the provision of the coding gain of the code.

As described above, the convolutional encoder 302 is a linear feedback shift register, constructed of three delay elements 303, 304 and 305 (conventionally denoted by $z^{-1}$) interspersed with and separated by two summing circuits 307 and 308 which function to combine the two least significant bits (LSBs), $D_0$ and $D_1$, of the input word with the output of the first and second delay elements, 303 and 304 respectively. The two time sequences formed by the streams of the two LSBs are convolved with the coefficients of the linear feedback shift register to produce the time sequence of the redundancy bit C. Thus, the convolutional encoder might be viewed as a state machine.

The signal mapper 304 maps the 9 bits ($D_0$-$D_7$ and C) into a particular 4-dimensional constellation point. Each of the four dimensions uniquely corresponds to one of the four twisted wire pairs. In each dimension, the possible symbols are from the symbol set $\{-2, -1, 0, +1, +2\}$. The symbol set is partitioned into two disjoint symbol subsets X and Y, with X=$\{-1, +1\}$ and Y=$\{-2, 0, +2\}$, as described above and shown in FIG. 4A.

Referring to FIG. 4B, the eight code subsets s0 through s7 define the constellation of the code in the signal space. Each of the code subsets is formed by the union of two code sub-subsets, each of the code sub-subsets being formed by 4D patterns obtained from concatenation of symbols taken from the symbol subsets X and Y. For example, the code subset s0 is formed by the union of the 4D patterns from the 4D code sub-subsets XXXX and YYYY. It should be noted that the distance between any two arbitrary even (respectively, odd) code-subsets is $\sqrt{2}$. It should be further noted that each of the code subsets is able to define at least 72 constellation points. However, only 64 constellation points in each code subset are recognized as codewords of the trellis code specified in the 1000BASE-T standard.

This reduced constellation is termed the pruned constellation. Hereinafter, the term "codeword" is used to indicate a 4D symbol that belongs to the pruned constellation. A valid codeword is part of a valid path in the trellis diagram.

Referring now to FIG. 3 and with reference to FIGS. 4A and 4B, in operation, the signal mapper 304 uses the 3 bits $D_1$, $D_0$ and C to select one of the code subsets s0-s7, and uses the 6 MSB bits of the input signal, $D_2$-$D_7$ to select one of 64 particular points in the selected code subset. These 64 particular points of the selected coded subset correspond to codewords of the trellis code. The signal mapper 304 outputs the selected 4D constellation point 306 which will be placed on the four twisted wire pairs after pulse shape filtering and digital-to-analog conversion.

Figure 5:
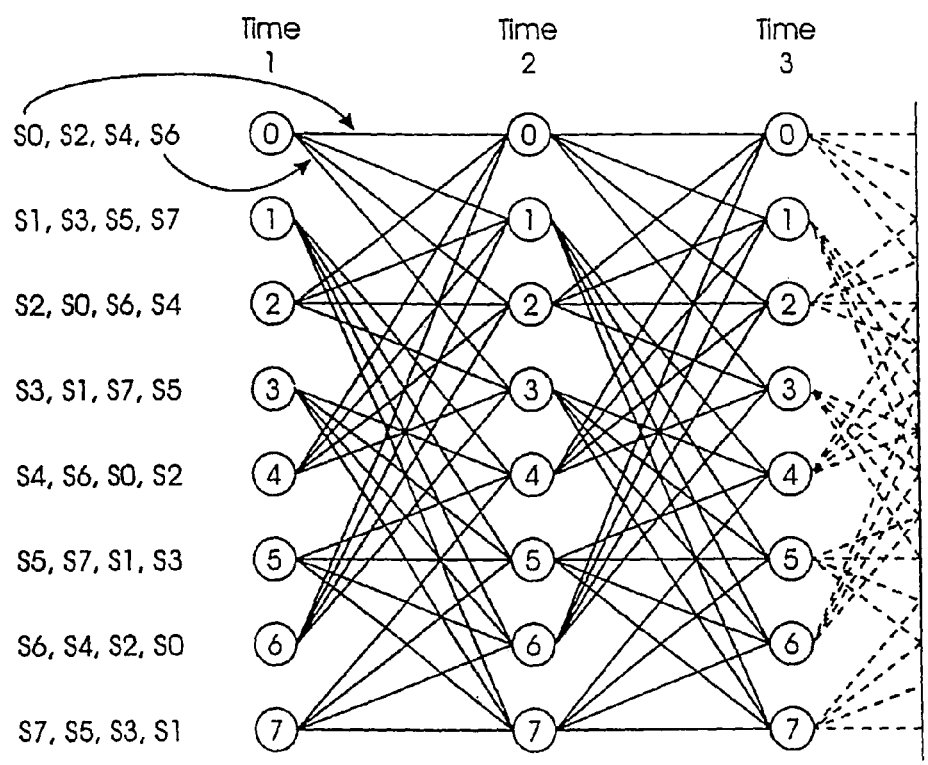
FIG. 5 illustrates the trellis diagram for the code.

FIG. 5 shows the trellis diagram for the trellis code specified in the 1000BASE-T standard. In the trellis diagram, each vertical column of nodes represents the possible states that the encoder 300 (FIG. 3) can assume at a point in time. It is noted that the states of the encoder 300 are dictated by the states of the convolutional encoder 302 (FIG. 3). Since the convolutional encoder 302 has three delay elements, there are eight distinct states. Successive columns of nodes represent the possible states that might be defined by the convolutional encoder state machine at successive points in time.

Referring to FIG. 5, the eight distinct states of the encoder 300 are identified by numerals 0 through 7, inclusive. From any given current state, each subsequent transmitted 4D symbol must correspond to a transition of the encoder 300 from the given state to a permissible successor state. For example, from the current state 0 (respectively, from current states 2, 4, 6), a transmitted 4D symbol taken from the code subset s0 corresponds to a transition to the successor state 0 (respectively, to successor states 1, 2 or 3). Similarly, from current state 0, a transmitted 4D symbol taken from code subset s2 (respectively, code subsets s4, s6) corresponds to a transition to successor state 1 (respectively, successor states 2, 3).

The trellis diagram of FIG. 5 shows that, from any even state (i.e., states 0, 2, 4 or 6), valid transitions can only be made to certain ones of the successor states, i.e., states 0, 1, 2 or 3. From any odd state (states 1, 3, 5 or 7), valid transitions can only be made to the remaining successor states, i.e., states 4, 5, 6 or 7. Each transition in the trellis diagram, also called a branch, is thought characterized by the predecessor state (the state it leaves), the successor state (the state it enters) and the corresponding transmitted 4D symbol. A valid sequence of states is represented by a path through the trellis which follows the above noted rules. A valid sequence of states corresponds to a valid sequence of transmitted 4D symbols.

At the receiving end of the communication channel, the trellis decoder 38 uses the methodology represented by the trellis diagram of FIG. 5 to decode a sequence of received signal samples into their symbolic representation, in accordance with the well known Viterbi algorithm. A traditional Viterbi decoder processes information signals iteratively, on an information frame by information frame basis (in the Gigabit Ethernet case, each information frame is a 4D received signal sample corresponding to a 4D symbol), tracing through a trellis diagram corresponding to the one used by the encoder, in an attempt to emulate the encoder's behavior. At any particular frame time, the decoder is not instantaneously aware of which node (or state) the encoder has reached, thus, it does not try to decode the node at that particular frame time. Instead, given the received sequence of signal samples, the decoder calculates the most likely path to every node and determines the distance between each of such paths and the received sequence in order to determine a quantity called the path metric.

In the next frame time, the decoder determines the most likely path to each of the new nodes of that frame time. To get to anyone of the new nodes, a path must pass through one of the old nodes. Possible paths to each new node are obtained by extending to this new node each of the old paths that are allowed to be thus extended, as specified by the trellis diagram. In the trellis diagram of FIG. 5, there are four possible paths to each new node. For each new node, the extended path with the smallest path metric is selected as the most likely path to this new node.

By continuing the above path-extending process, the decoder determines a set of surviving paths to the set of nodes at the nth frame time. If all of the paths pass through the same node at the first frame time, then the traditional decoder knows which most likely node the encoder entered at the first frame time, regardless of which node the encoder entered at the nth frame time. In other words, the decoder knows how to decode the received information associated with the first frame time, even though it has not yet made a decision for the received information associated with the nth frame time. At the nth frame time, the traditional decoder examines all surviving paths to see if they pass through the same first branch in the first frame time. If they do, then the valid symbol associated with this first branch is outputted by the decoder as the decoded information frame for the first frame time. Then, the decoder drops the first frame and takes in a new frame for the next iteration. Again, if all surviving paths pass through the same node of the oldest surviving frame, then this information frame is decoded. The decoder continues this frame-by-frame decoding process indefinitely so long as information is received.

The number of symbols that the decoder can store is called the decoding-window width. The decoder must have a decoding window width large enough to ensure that a well-defined decision will almost always be made at a frame time. As discussed later in connection with FIGS. 13 and 14, the decoding window width of the trellis decoder 38 of FIG. 2 is 10 symbols. This length of the decoding window is selected based on results of computer simulation of the trellis decoder 38.

A decoding failure occurs when not all of the surviving paths to the set of nodes at frame time n pass through a common first branch at frame time 0. In such a case, the traditional decoder would defer making a decision and would continue tracing deeper in the trellis. This would cause unacceptable latency for a high-speed system such as the gigabit Ethernet transceiver. Unlike the traditional decoder, the trellis decoder 38 of the present invention does not check whether the surviving paths pass through a common first branch. Rather, the trellis decoder, in accordance with the invention, makes an assumption that the surviving paths at frame time n pass through such a branch, and outputs a decision for frame time 0 on the basis of that assumption. If this decision is incorrect, the trellis decoder 38 will necessarily output a few additional incorrect decisions based on the initial perturbation, but will soon recover due to the nature of the particular relationship between the code and the characteristics of the transmission channel. It should, further, be noted that this potential error introduction source is relatively trivial in actual practice, since the assumption made by the trellis decoder 38 that all the surviving paths at frame time n pass through a common first branch at frame time 0 is a correct one to a very high statistical probability.

Figure 6:
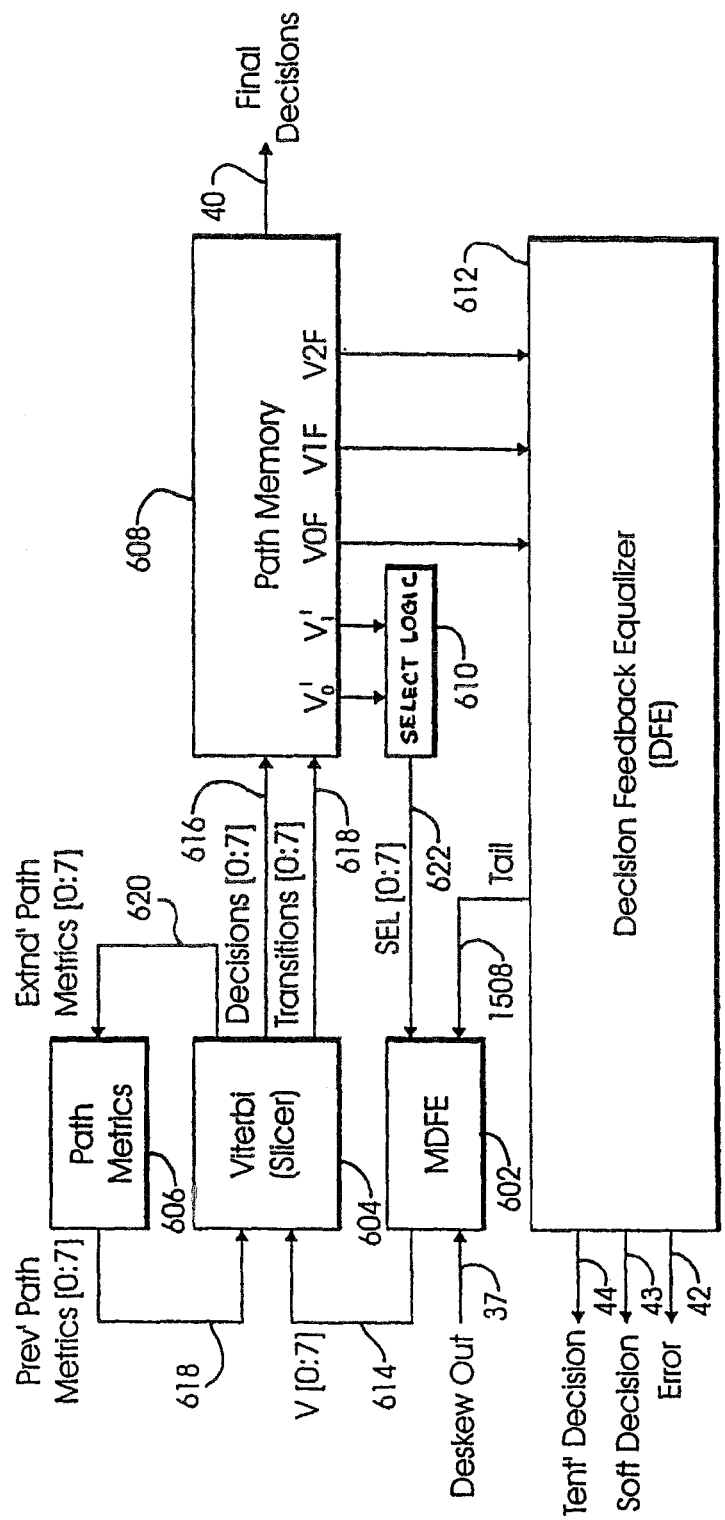
FIG. 6 is a simplified block diagram of an exemplary trellis decoder, including a Viterbi decoder, in accordance with the invention, suitable for decoding signals coded by the exemplary trellis encoder of FIG. 3.

FIG. 6 is a simplified block diagram of the construction details of an exemplary trellis decoder such as described in connection with FIG. 2. The exemplary trellis decoder 38 includes a multiple decision feedback equalizer (MDFE) 602, Viterbi decoder circuitry 604, a path metrics module 606, a path memory module 608, a select logic 610, and a decision feedback equalizer 612. In general, a Viterbi decoder is often thought of as including the path metrics module and the path memory module. However, because of the unique arrangement and functional operation of the elements of the exemplary trellis decoder 38, the functional element which performs the slicing operation will be referred to herein as Viterbi decoder circuitry, a Viterbi decoder, or colloquially a Viterbi.

The Viterbi decoder circuitry 604 performs 4D slicing of signals received at the Viterbi inputs 614, and computes the branch metrics. A branch metric, as the term is used herein, is well known and refers to an elemental path between neighboring trellis nodes. A plurality of branch metrics will thus be understood to make up a path metric. An extended path metric will be understood to refer to a path metric, which is extended by a next branch metric to thereby form an extension to the path. Based on the branch metrics and the previous path metrics information 618 received from the path metrics module 606, the Viterbi decoder 604 extends the paths and computes the extended path metrics 620 which are returned to the path metrics module 606. The Viterbi decoder 604 selects the best path incoming to each of the eight states, updates the path memory stored in the path memory module 608 and the path metrics stored in the path metrics module 606.

In the traditional Viterbi decoding algorithm, the inputs to a decoder are the same for all the states of the code. Thus, a traditional Viterbi decoder would have only one 4D input for a 4D 8-state code. In contrast, and in accordance with the present invention, the inputs 614 to the Viterbi decoder 604 are different for each of the eight states. This is the result of the fact that the Viterbi inputs 614 are defined by feedback signals generated by the MDFE 602 and are different for each of the eight paths (one path per state) of the Viterbi decoder 604, as will be discussed later.

There are eight Viterbi inputs 614 and eight Viterbi decisions 616, each corresponding to a respective one of the eight states of the code. Each of the eight Viterbi inputs 614, and each of the decision outputs 618, is a 4 dimensional vector whose four components are the Viterbi inputs and decision outputs for the four constituent transceivers, respectively. In other words, the four components of each of the eight Viterbi inputs 614 are associated with the four pairs of the Category-5 cable. The four components form a received word that corresponds to a valid codeword. From the foregoing, it should be understood that detection (decoding, demodulation, and the like) of information signals in a gigabit system is inherently computationally intensive. When it is further realized that received information must be detected at a very high speed and in the presence of ISI channel impairments, the difficulty in achieving robust and reliable signal detection will become apparent.

In accordance with the present invention, the Viterbi decoder 604 detects a non-binary word by first producing a set of one-dimensional (1D) decisions and a corresponding set of 1D errors from the 4D inputs. By combining the 1D decisions with the 1D errors, the decoder produces a set of 4D decisions and a corresponding set of 4D errors. Hereinafter, this generation of 4D decisions and errors from the 4D inputs is referred to as 4D slicing. Each of the 1D errors represents the distance metric between one 1D component of the eight 4D-inputs and a symbol in one of the two disjoint symbol-subsets X, Y. Each of the 4D errors is the distance between the received word and the corresponding 4D decision which is a codeword nearest to the received word with respect to one of the code-subsets $S_i$, where i=0, . . . 7.

The 4D errors may also be characterized as the branch metrics in the Viterbi algorithm. The branch metrics are added to the previous values of path metrics 618 received from the path metrics module 606 to form the extended path metrics 620 which are then stored in the path metrics module 606, replacing the previous path metrics. For anyone given state of the eight states of the code, there are four incoming paths. For a given state, the Viterbi decoder 604 selects the best path, i.e., the path having the lowest metric of the four paths incoming to that state, and discards the other three paths. The best path is saved in the path memory module 608. The metric associated with the best path is stored in the path metrics module 606, replacing the previous value of the path metric stored in that module.

In the following, the 4D slicing function of the Viterbi decoder 604 will be described in detail. 4D slicing may be described as being performed in three sequential steps. In a first step, a set of 1D decisions and corresponding 1D errors are generated from the 4D Viterbi inputs. Next, the 1D decisions and 1D errors are combined to form a set of 2D decisions and corresponding 2D errors. Finally, the 2D decisions and 2D errors are combined to form 4D decisions and corresponding 4D errors.

Figure 7:
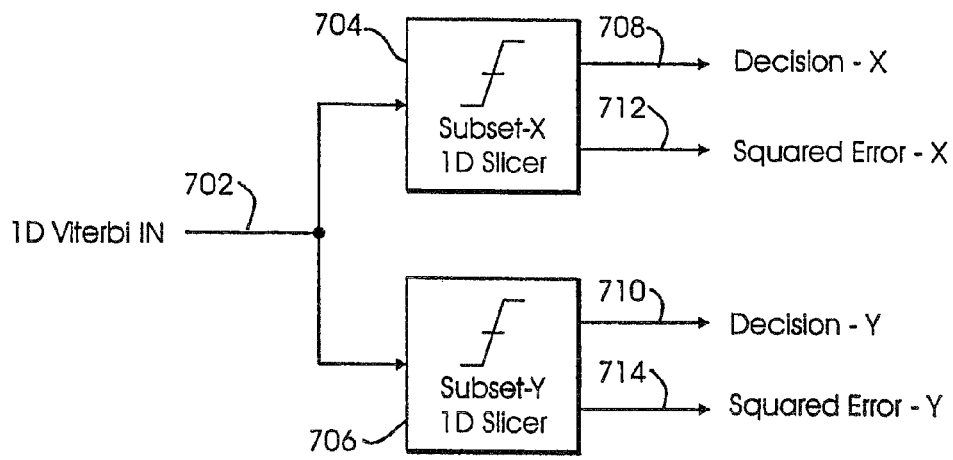
FIG. 7 is a simplified block diagram of a first exemplary embodiment of a structural analog of a ID slicing function as might be implemented in the Viterbi decoder of FIG. 6.

FIG. 7 is a simplified, conceptual block diagram of a first exemplary embodiment of a 1D slicing function such as may be implemented by the Viterbi decoder 604 of FIG. 6. Referring to FIG. 7, a 1D component 702 of the eight 4D Viterbi inputs (614 of FIG. 6) is sliced, i.e., detected, in parallel fashion, by a pair of 1D slicers 704 and 706 with respect to the X and Y symbol-subsets. Each slicer 704, 706 outputs a respective 1D decision 708, 710 with respect to the appropriate respective symbol-subset X, Y and an associated squared error value 712, 714. The 1D decision 708 (respectively, 710) is the symbol which is closest to the 1D input 702 in the symbol-subset X (respectively, Y). The squared error values 712 and 714 represent the square of the difference between the 1D input 702 and their respective 1D decisions 708 and 710.

The 1D slicing function shown in FIG. 7 is performed for all four constituent transceivers and for all eight states of the trellis code in order to produce one pair of 1D decisions per transceiver and per state. Thus, the Viterbi decoder 604 has a total of 32 pairs of 1D slicers configured identically to the pair of slicers 704, 706 illustrated in FIG. 7.

Figure 8:
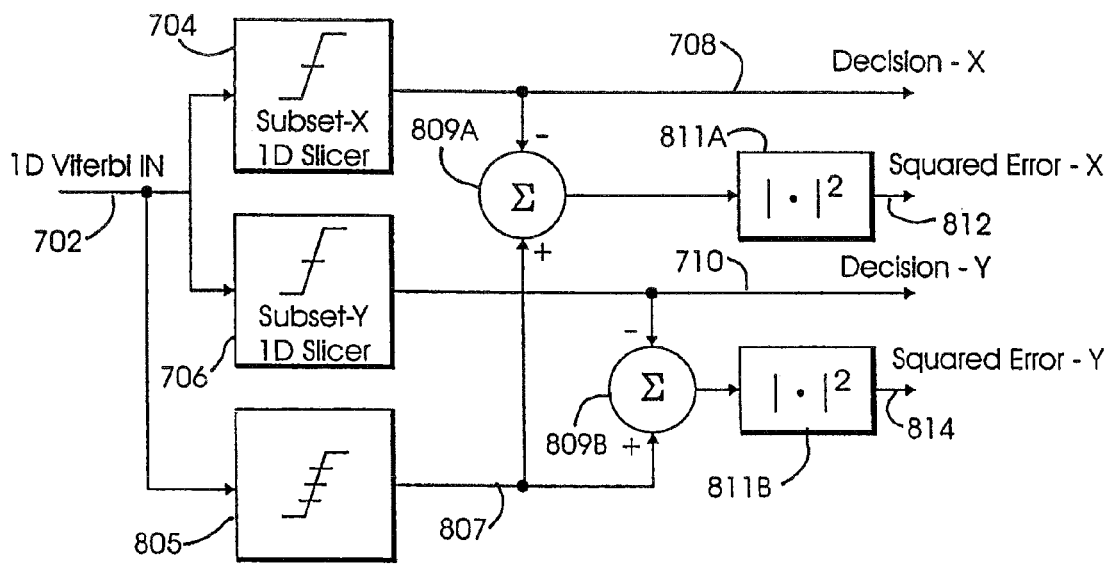
FIG. 8 is a simplified block diagram of a second exemplary embodiment of a structural analog of a ID slicing function as may be implemented in the Viterbi decoder of FIG. 6.

FIG. 8 is a simplified block diagram of a second exemplary embodiment of circuitry capable of implementing a 1D slicing function suitable for incorporation in the Viterbi decoder 604 of FIG. 5. Referring to FIG. 8, the 1D component 702 of the eight 4D Viterbi inputs is sliced, i.e., detected, by a first pair of 1D slicers 704 and 706, with respect to the X and Y symbol-subsets, and also by a 5-level slicer 805 with respect to the symbol set which represents the five levels (+2, +1, 0, −1, −2) of the constellation, i.e., a union of the X and Y symbol-subsets. As in the previous case described in connection with FIG. 7, the slicers 704 and 706 output 1D decisions 708 and 710. The 1D decision 708 is the symbol which is nearest the 1D input 702 in the symbol-subset X, while 1D decision 710 corresponds to the symbol which is nearest the 1D input 702 in the symbol-subset Y. The output 807 of the 5-level slicer 805 corresponds to the particular one of the five constellation symbols which is determined to be closest to the 1D input 702.

The difference between each decision 708 and 710 and the 5-level slicer output 807 is processed, in a manner to be described in greater detail below, to generate respective quasi-squared error terms 812 and 814. In contrast to the 1D error terms 712, 714 obtained with the first exemplary embodiment of a 1D slicer depicted in FIG. 7, the 1D error terms 812, 814 generated by the exemplary embodiment of FIG. 8 are more easily adapted to discerning relative differences between a 1D decision and a 1D Viterbi input.

In particular, the slicer embodiment of FIG. 7 may be viewed as performing a "soft decode", with 1D error terms 712 and 714 represented by Euclidian metrics. The slicer embodiment depicted in FIG. 8 may be viewed as performing a "hard decode", with its respective ID error terms 812 and 814 expressed in Hamming metrics (i.e., 1 or 0). Hamming metrics can be expressed in a fewer number of bits, than Euclidian metrics, resulting in a system that is substantially less computationally complex and substantially faster.

In the exemplary embodiment of FIG. 8, error terms are generated by combining the output of the five level slicer 805 with the outputs of the 1D slicers 704 and 706 in respective adder circuits 809A and 809B. The outputs of the adders are directed to respective squared magnitude blocks 811A and 811B which generate the binary squared error terms 812 and 814, respectively.

Implementation of squared error terms by use of circuit elements such as adders 809A, 809B and the magnitude squared blocks 811A, 811B is done for descriptive convenience and conceptual illustration purposes only. In practice, squared error term definition is implemented with a look-up table that contains possible values for error-X and error-Y for a given set of decision-X; decision-Y and Viterbi input values. The look-up table can be implemented with a read-only-memory device or alternatively, a random logic device or PLA. Examples of look-up tables, suitable for use in practice of the present invention, are illustrated in FIGS. 17, 18A and 18B.

The 1D slicing function exemplified in FIG. 8 is performed for all four constituent transceivers and for all eight states of the trellis code in order to produce one pair of 1D decisions per transceiver and per state. Thus, the Viterbi decoder 604 has a total of thirty two pairs of 1D slicers that correspond to the pair of slicers 704, 706, and thirty two 5-level slicers that correspond to the 5-level slicer 805 of FIG. 8.

Each of the 1D errors is represented by substantially fewer bits than each 1D component of the 4D inputs. For example, in the embodiment of FIG. 7, the 1D component of the 4D Viterbi input is represented by 5 bits while the 1D error is represented by 2 or 3 bits. Traditionally, proper soft decision decoding of such a trellis code would require that the distance metric (Euclidean distance) be represented by 6 to 8 bits. One advantageous feature of the present invention is that only 2 or 3 bits are required for the distance metric in soft decision decoding of this trellis code.

In the embodiment of FIG. 8, the 1D error can be represented by just 1 bit. It is noted that, since the 1D error is represented by 1 bit, the distance metric used in this trellis decoding is no longer the Euclidean distance, which is usually associated with trellis decoding, but is instead the Hamming distance, which is usually associated with hard decision decoding of binary codewords. This is another particularly advantageous feature of the present invention.

Figure 9:
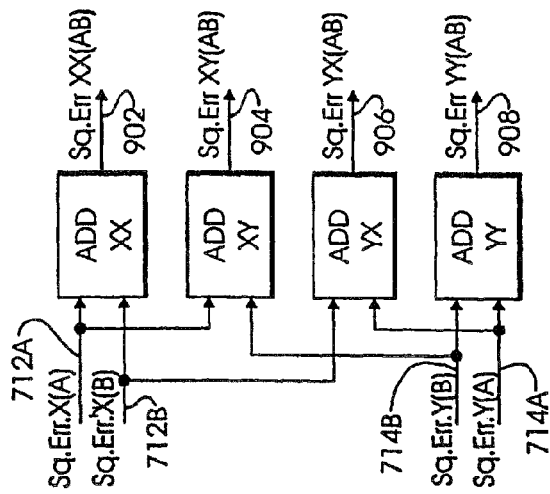
FIG. 9 is a simplified block diagram of a 2D error term generation module, illustrating the generation of 2D square error terms from the ID square error terms developed by the exemplary slicers of FIG. 7 or 8.

FIG. 9 is a block diagram illustrating the generation of the 2D errors from the 1D errors for twisted pairs A and B (corresponding to constituent transceivers A and B). Since the generation of errors is similar for twisted pairs C and D, this discussion will only concern itself with the A:B 2D case. It will be understood that the discussion is equally applicable to the C:D 2D case with the appropriate change in notation. Referring to FIG. 9, 1D error signals 712A, 712B, 714A, 714B might be produced by the exemplary 1D slicing functional blocks shown in FIG. 7 or 8. The 1D error term signal 712A (or respectively, 712B) is obtained by slicing, with respect to symbol-subset X, the 1D component of the 4D Viterbi input, which corresponds to pair A (or respectively, pair B). The 1D error term 714A (respectively, 714B) is obtained by slicing, with respect to symbol-subset Y, the 1D component of the 4D Viterbi input, which corresponds to pair A (respectively, B). The 1D errors 712A, 712B, 714A, 714B are added according to all possible combinations (XX, XY, YX and YY) to produce 2D error terms 902AB, 904AB, 906AB, 908AB for pairs A and B. Similarly, the 1D errors 712C, 712D, 714C, 714D (not shown) are added according to the four different symbol-subset combinations XX, XY, YX and YY) to produce corresponding 2D error terms for wire pairs C and D.

Figure 10:
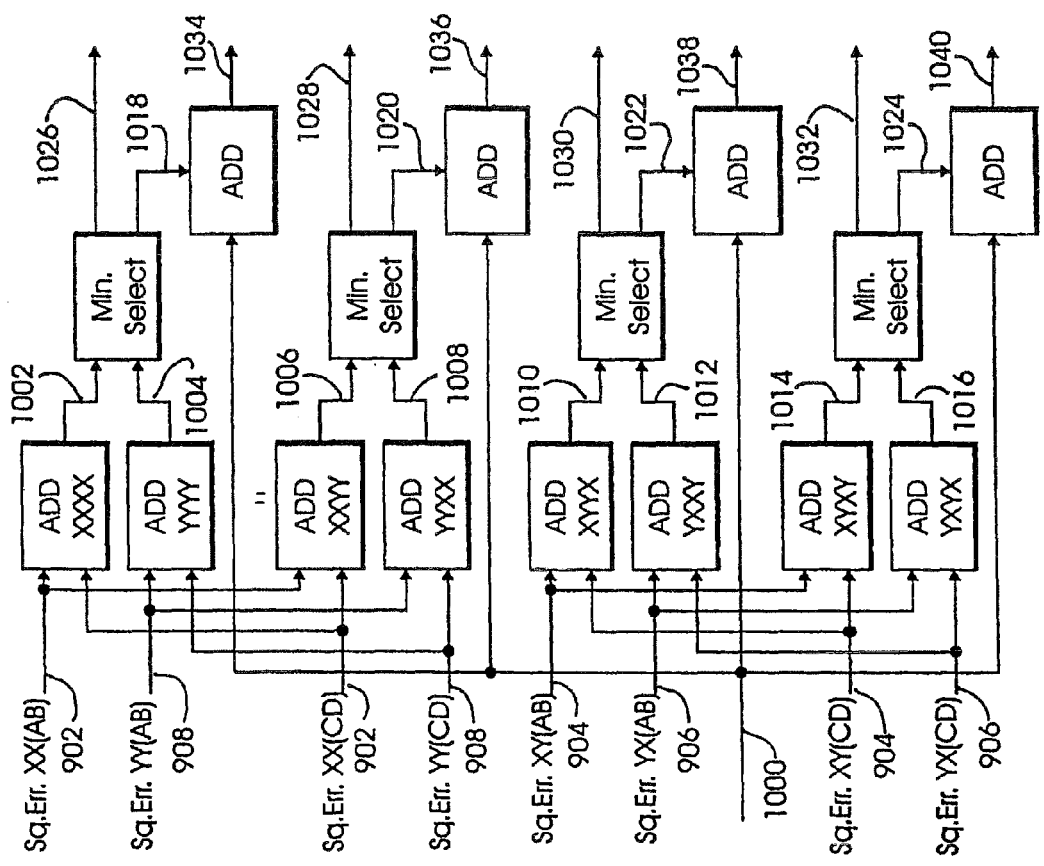
FIG. 10 is a simplified block diagram of a 4D error term generation module-illustrating the generation of 4D square error terms and the generation of extended path metrics for the 4 extended paths outgoing from state 0.

FIG. 10 is a block diagram illustrating the generation of the 4D errors and extended path metrics for the four extended paths outgoing from state 0. Referring to FIG. 10, the 2D errors 902AB, 902CD, 904AB, 904CD, 906AB, 906 CD, 908AE, 908 CD are added in pairs according to eight different combinations to produce eight intermediate 4D errors 1002, 1004, 1006, 1008, 1010, 1012, 1014, 1016. For example, the 2D error 902AB, which is the squared error with respect to XX from pairs A and B, are added to the 2D error 902CD, which is the squared error with respect to XX from pairs C and D, to form the intermediate 4D error 1002 which is the squared error with respect to sub-subset XXXX for pairs A, B, C and D. Similarly, the intermediate 4D error 1004 which corresponds to the squared error with respect to sub-subset YYYY is formed from the 2D errors 908AB and 908CD.

The eight intermediate 4D errors are grouped in pairs to correspond to the code subsets s0, s2, s4 and s6 represented in FIG. 4B. For example, the intermediate 4D errors 1002 and 1004 are grouped together to correspond to the code subset s0 which is formed by the union of the XXXX and YYYY sub-subsets. From each pair of intermediate 4D errors, the one with the lowest value is selected (the other one being discarded) in order to provide the branch metric of a transition in the trellis diagram from state 0 to a subsequent state. It is noted that, according to the trellis diagram, transitions from an even state (i.e., 0, 2, 4 and 6) are only allowed to be to the states 0, 1, 2 and 3, and transitions from an odd state (i.e., 1, 3, 5 and 7) are only allowed to be to the states 4, 5, 6 and 7. Each of the index signals 1026, 1028, 1030, 1032 indicates which of the 2 sub-subsets the selected intermediate 4D error corresponds to. The branch metrics 1018, 1020, 1022, 1024 are the branch metrics for the transitions in the trellis diagram of FIG. 5 associated with code-subsets s0, s2, s4 and s6 respectively, from state 0 to states 0, 1, 2 and 3, respectively. The branch metrics are added to the previous path metric 1000 for state 0 in order to produce the extended path metrics 1034, 1036, 1038, 1040 of the four extended paths outgoing from state 0 to states 0, 1, 2 and 3, respectively.

Associated with the eight intermediate 4D errors 1002, 1004, 1006, 1008, 1010, 1012, 1014, 1016 are the 4D decisions which are formed from the 1D decisions made by one of the exemplary slicer embodiments of FIG. 7 or 8. Associated with the branch metrics 1018, 1020, 1022, 1024 are the 4D symbols derived by selecting the 4D decisions using the index outputs 1026, 1028, 1030, 1032.

Figure 11:
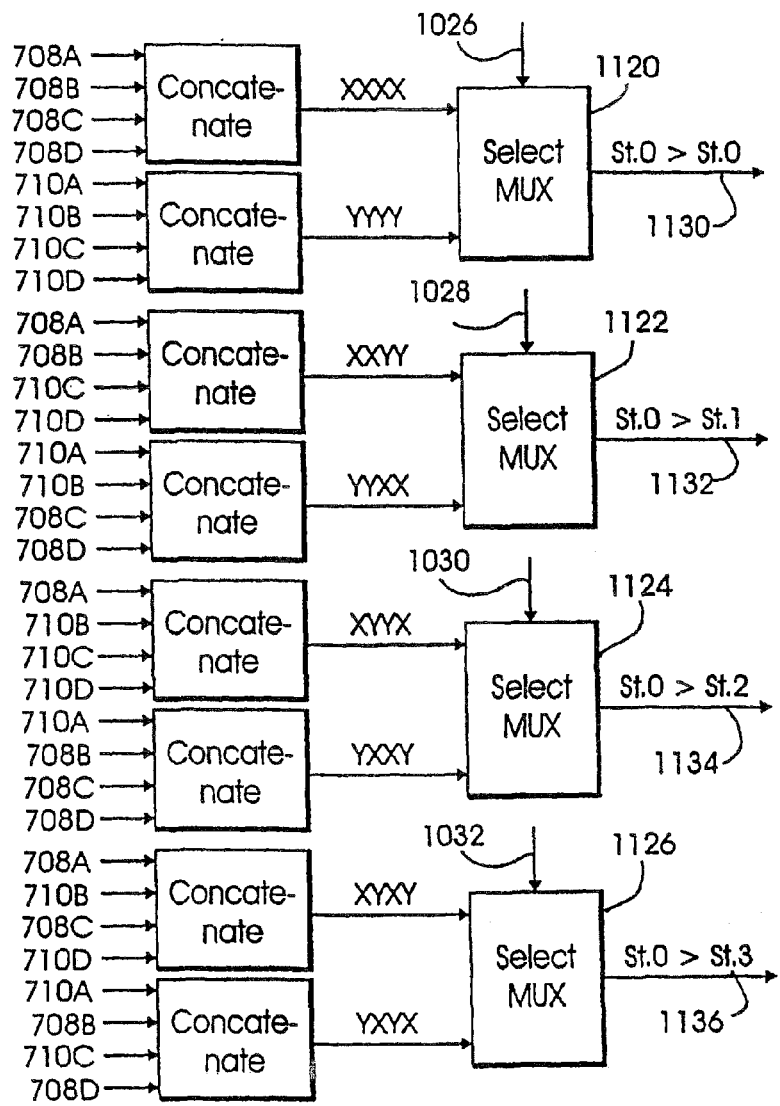
FIG. 11 is a simplified block diagram of a 4D symbol generation module.

FIG. 11 shows the generation of the 4D symbols associated with the branch metrics 1018, 1020, 1022, 1024. Referring to FIG. 11, the 1D decisions 708A, 708B, 708C, 708D are the 1D decisions with respect to symbol-subset X (as shown in FIG. 7) for constituent transceivers A, B, C, D, respectively, and the 1D decisions 714A, 714B, 714C, 714D are the 1D decisions with respect to symbol-subset Y for constituent transceivers A, B, C and D, respectively. The 1D decisions are concatenated according to the combinations which correspond to a left or right hand portion of the code subsets s0, s2, s4 and s6, as depicted in FIG. 4B. For example, the 1D decisions 708A, 708B, 708C, 708D are concatenated to correspond to the left hand portion, XXXX, of the code subset s0. The 4D decisions are grouped in pairs to correspond to the union of symbol-subset portions making up the code subsets s0, s2, s4 and s6. In particular, the 4D decisions 1102 and 1104 are grouped together to correspond to the code subset s0 which is formed by the union of the XXXX and YYYY subset portions.

Referring to FIG. 11, the pairs of 4D decisions are inputted to the multiplexers 1120, 1122, 1124, 1126 which receive the index signals 1026, 1028, 1030, 1032 (FIG. 10) as select signals. Each of the multiplexers selects from a pair of the 4D decisions, the 4D decision which corresponds to the subsubset indicated by the corresponding index signal and outputs the selected 4D decision as the 4D symbol for the branch whose branch metric is associated with the index signal. The 4D symbols 1130, 1132, 1134, 1136 correspond to the transitions in the trellis diagram of FIG. 5 associated with codesubsets s0, s2, s4 and s6 respectively, from state 0 to states 0, 1, 2 and 3, respectively. Each of the 4D symbols 1130, 1132, 1134, 1136 is the codeword in the corresponding code-subset (s0, s2, s4 and s6) which is closest to the 4D Viterbi input for state o (there is a 4D Viterbi input for each state). The associated branch metric (FIG. 10) is the 4D squared distance between the codeword and the 4D Viterbi input for state 0.

Figure 12:
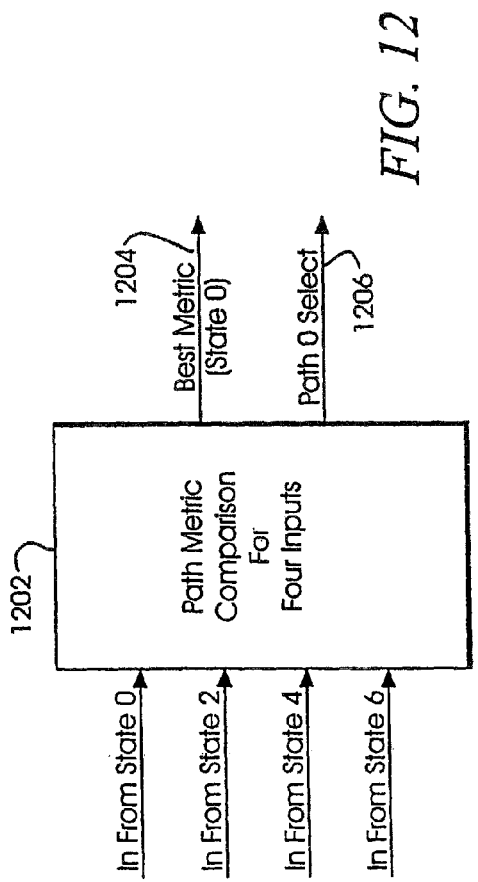
FIG. 12 illustrates the selection of the best path incoming to state 0.

FIG. 12 illustrates the selection of the best path incoming to state 0. The extended path metrics of the four paths incoming to state 0 from states 0, 2, 4 and 6 are inputted to the comparator module 1202 which selects the best path, i.e., the path with the lowest path metric, and outputs the Path 0 Select signal 1206 as an indicator of this path selection, and the associated path metric 1204.

The procedure described above for processing a 4D Viterbi input for state of the code to obtain four branch metrics, four extended path metrics, and four corresponding 4D symbols is similar for the other states. For each of the other states, the selection of the best path from the four incoming paths to that state is also similar to the procedure described in connection with FIG. 12.

The above discussion of the computation of the branch metrics, illustrated by FIG. 7 through 11, is an exemplary application of the method for slicing (detecting) a received L-dimensional word and for computing the distance of the received L-dimensional word from a codeword, for the particular case where L is equal to 4.

In general terms, i.e., for any value of L greater than 2, the method can be described as follows. The codewords of the trellis code are constellation points chosen from $2^{L-1}$ codesubsets. A codeword is a concatenation of L symbols selected from two disjoint symbol-subsets and is a constellation point belonging to one of the $2^{L-1}$ code-subsets. At the receiver, L inputs are received, each of the L inputs uniquely corresponding to one of the L dimensions. The received word is formed by the L inputs. To detect the received word, $2^{L-1}$ identical input sets are formed by assigning the same L inputs to each of the $2^{L-1}$ input sets. Each of the L inputs of each of the $2^{L-1}$ input sets is sliced with respect to each of the two disjoint symbol-subsets to produce an error set of 2 L one-dimensional errors for each of the $2^{L-1}$ code-subsets. For the particular case of the trellis code of the type described by the trellis diagram of FIG. 5, the one-dimensional errors are combined within each of the $2^{L-1}$ error sets to produce $2^{L-2}$ L-dimensional errors for the corresponding code-subset such that each of the $2^{L-2}$ L-dimensional errors is a distance between the received word and one of the codewords in the corresponding code-subset.

One embodiment of this combining operation can be described as follows. First, the 2 L one-dimensional errors are combined to produce 2 L two-dimensional errors (FIG. 9). Then, the 2 L two-dimensional errors are combined to produce 2 L intermediate L-dimensional errors which hare arranged into $2^{L-1}$ pairs of errors such that these pairs of errors correspond one-to-one to the $2^{L-1}$ code-subsets (FIG. 10, signals 1002 through 1016). A minimum is selected for each of the $2^{L-1}$ pairs of errors (FIG. 10, signals 1026, 1028, 1030, 1032). These minima are the $2^{L-1}$ L-dimensional errors. Due to the constraints on transitions from one state to a successor state, as shown in the trellis diagram of FIG. 5, only half of the $2^{L-1}$ L-dimensional errors correspond to allowed transitions in the trellis diagram. These $2^{L-2}$ L-dimensional errors are associated with $2^{L-2}$ L-dimensional decisions. Each of the $2^{L-2}$-dimensional decisions is a codeword closest in distance to the received word (the distance being represented by one of the $2^{L-2}$-dimensional errors), the codeword being in one of half of the $2^{L-1}$ code-subsets, i.e., in one of $2^{L-2}$ code-subsets of the $2^{L-1}$ code-subsets (due to the particular constraint of the trellis code described by the trellis diagram of FIG. 5).

It is important to note that the details of the combining operation on the 2 L one-dimensional errors to produce the final L-dimensional errors and the number of the final L-dimensional errors are functions of a particular trellis code. In other words, they vary depending on the particular trellis code.

Figure 13:
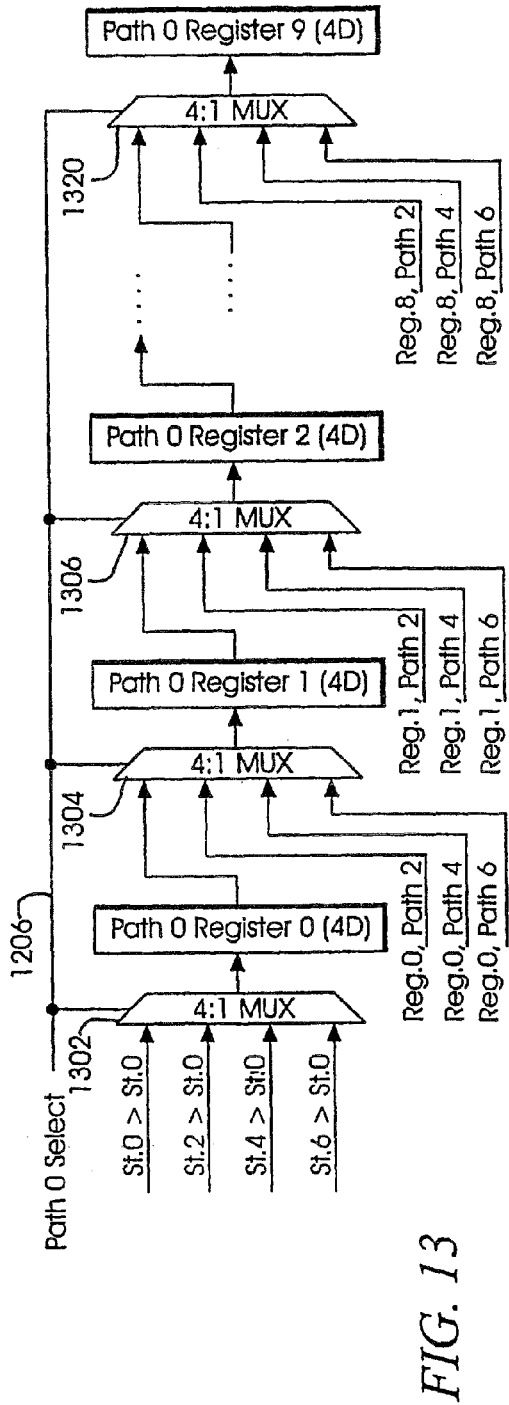
FIG. 13 is a semi-schematic block diagram illustrating the internal arrangement of a portion of the path memory module of FIG. 6.

FIG. 13 illustrates the construction of the path memory module 608 as implemented in the embodiment of FIG. 6. The path memory module 608 includes a path memory for each of the eight paths. In the illustrated embodiment of the invention, the path memory for each path is implemented as a register stack, ten levels in depth. At each level, a 4D symbol is stored in a register. The number of path memory levels is chosen as a tradeoff between receiver latency and detection accuracy. FIG. 13 only shows the path memory for path 0 and continues with the example discussed in FIGS. 7-12. FIG. 13 illustrates how the 4D decision for the path 0 is stored in the path memory module 608, and how the Path 0 Select signal, i.e., the information about which one of the four incoming extended paths to state 0 was selected, is used in the corresponding path memory to force merging of the paths at all depth levels (levels 0 through 9) in the path memory.

Referring to FIG. 13, each of the ten levels of the path memory includes a 4-to-1 multiplexer (4:1 MUX) and a register to store a 4D decision. The registers are numbered according to their depth levels. For example, register 0 is at depth level 0. The Path 0 Select signal 1206 (FIG. 12) is used as the select input for the 4:1 MUXes 1302, 1304, 1306, . . . , 1320. The 4D decisions 1130, 1132, 1134, 1136 (FIG. 11) are inputted to the 4:1 MUX 1302 which selects one of the four 4D decisions based on the Path 0 select signal 1206 and stores it in the register 0 of path 0. One symbol period later, the register 0 of path 0 outputs the selected 4D decision to the 4:1 MUX 1304. The other three 4D decisions inputted to the 4:1 MUX 1304 are from the registers 0 of paths 2, 4, and 6. Based on the Path 0 Select signal 1206, the 4:1 MUX 1304 selects one of the four 4D decisions and stores it in the register 1 of path 0. One symbol period later, the register 1 of path 0 outputs the selected 4D decision to the 4:1 MUX 1306. The other three 4D decisions inputted to the 4:1 MUX 1306 are from the registers 1 of paths 2, 4, and 6. Based on the Path 0 Select signal 1206, the 4:1 MUX 1306 selects one of the four 4D decisions and stores it in the register 2 of path 0. This procedure continues for levels 3 through 9 of the path memory for path 0. During continuous operation, ten 4D symbols representing path 0 are stored in registers 0 through 9 of the path memory for path 0.

Similarly to path 0, each of the paths 1 though 7 is stored as ten 4D symbols in the registers of the corresponding path memory. The connections between the MUX of one path and registers of different paths follows the trellis diagram of FIG. 2. For example, the MUX at level k for path 1 receives as inputs the outputs of the registers at level k−1 for paths 1, 3, 5, 7, and the MUX at level k for path 2 receives as inputs the outputs of the registers at level k−1 for paths 0, 2, 4, 6.

Figure 14:
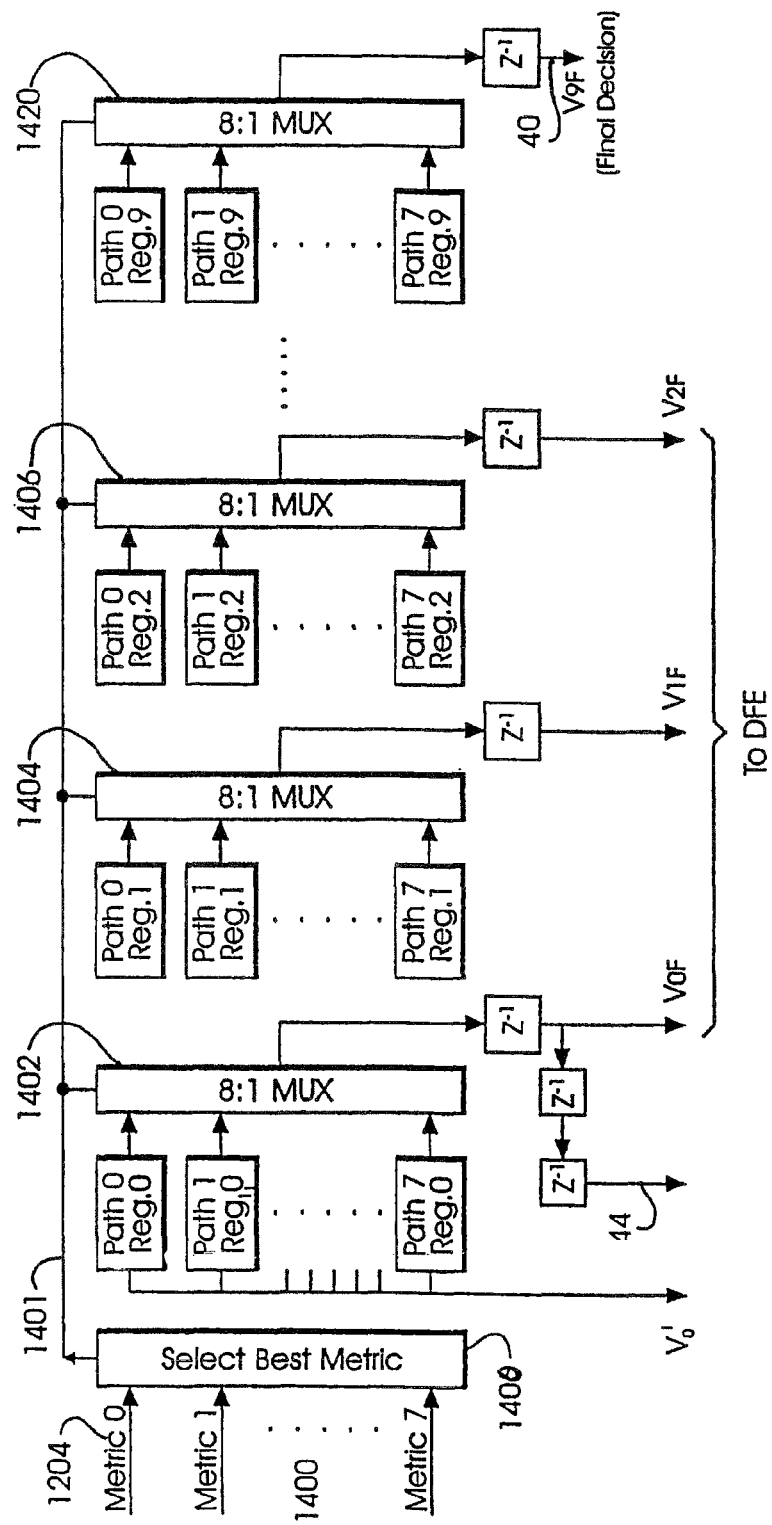
FIG. 14 is a block diagram illustrating the computation of the final decision and the tentative decisions in the path memory module based on the 4D symbols stored in the path memory for each state.

FIG. 14 is a block diagram illustrating the computation of the final decision and the tentative decisions in the path memory module 608 based on the 4D symbols stored in the path memory for each state. At each iteration of the Viterbi algorithm, the best of the eight states, i.e., the one associated with the path having the lowest path metric, is selected, and the 4D symbol from the associated path stored at the last level of the path memory is selected as the final decision 40 (FIG. 6). Symbols at lower depth levels are selected as tentative decisions, which are used to feed the delay line of the DFE 612 (FIG. 6).

Referring to FIG. 14, the path metrics 1402 of the eight states, obtained from the procedure of FIG. 12, are inputted to the comparator module 1400 which selects the one with the lowest value and provides an indicator 1401 of this selection to the select inputs of the 8-to-1 multiplexers (8:1 MUXes) 1402, 1404, 1406, Y, 1420, which are located at path memory depth levels 0 through 9, respectively. Each of the 8:1 MUXes receives eight 4D symbols outputted, from corresponding registers for the eight paths, the corresponding registers being located at the same depth level as the MUX, and selects one of the eight 4D symbols to output, based on the select signal 1401. The outputs of the 8:1 MUXes located at depth levels 0 through 9 are $V_0$, $V_1$, $V_2$, Y, $V_9$, respectively.

In the illustrated embodiment, one set of eight signals, outputted by the first register set (the register 0 set) to the first MUX. 1402, is also taken off as a set of eight outputs, denoted as $V_o(^i)$, i=1, . . . , 7, and provided to the MDFE (602 of FIG. 6) as a select signal which is used in a manner to be described below. Although only the first two register sets are illustrated as providing outputs to the DFE, higher order register sets may also provide similar outputs to the DFE. In cases where multiple register sets provide outputs, these are identified by the register set depth order as a subscript, as in $V_1(^i)$.

In the illustrated embodiment, the MUX outputs $V_0$, $V_1$, $V_2$ are delayed by one unit of time, and are then provided as the tentative decisions $V_{0F}$, $V_{1F}$, $V_{2F}$ to the DFE 612. The number of the outputs $V_i$ to be used as tentative decisions depends on the required accuracy and speed of decoding operation. After further delay, the output $V_0$ of the first MUX 1402 is also provided as the 4D tentative decision 44 (FIG. 2) to the Feedforward Equalizers 26 of the four constituent transceivers and the timing recovery block 222 (FIG. 2). The 4D symbol $V_{9F}$, which is the output $V_9$ of the 8:1 MUX 1420 delayed by one time unit, is provided as the final decision 40 to the receive section of the PCS 204R (FIG. 2).

The following is the discussion on how outputs $V_0{}^i$, $V_1{}^i$, $V_{0F}$, $V_{1F}$, $V_{2F}$ of the path memory module 608 may be used in the select logic 610, the MDFE 602, and the DFE 612 (FIG. 6).

FIG. 15 is a block level diagram of the ISI compensation portion of the decoder, including construction and operational details of the DFE and MDFE circuitry (612 and 602 of FIG. 6, respectively). The ISI compensation embodiment depicted in FIG. 15 is adapted to receive signal samples from the deskew memory (36 of FIG. 2) and provide ISI compensated signal samples to the Viterbi (slicer) for decoding. The embodiment illustrated in FIG. 15 includes the Viterbi block 1502 (which includes the Viterbi decoder 604, the path metrics module 606 and the path memory module 608), the select logic 610, the MDFE 602 and the DFE 612.

The MDFE 602 computes an independent feedback signal for each of the paths stored in the path memory module 608. These feedback signals represent different hypotheses for the intersymbol interference component present in the input 37 (FIGS. 2 and 6) to the trellis decoder 38. The different hypotheses for the intersymbol interference component correspond to the different hypotheses about the previous symbols which are represented by the different paths of the Viterbi decoder.

The Viterbi algorithm tests these hypotheses and identifies the most likely one. It is an essential aspect of the Viterbi algorithm to postpone this identifying decision until there is enough information to minimize the probability of error in the decision. In the meantime, all the possibilities are kept open. Ideally, the MDFE block would use the entire path memory to compute the different feedback signals using the entire length of the path memory. In practice, this is not possible because this would lead to unacceptable complexity. By "unacceptable", it is meant requiring a very large number of components and an extremely complex interconnection pattern.

Therefore, in the exemplary embodiment, the part of the feedback signal computation that is performed on a per-path basis is limited to the two most recent symbols stored in register set 0 and register set 1 of all paths in the path memory module 608, namely $V_0^{(i)}$ and $V_1^{(i)}$ with i=0, . . . , 7, indicating the path. For symbols older than two periods, a hard decision is forced, and only one replica of a "tail" component of the intersymbol interference is computed. This results in some marginal loss of performance, but is more than adequately compensated for by a simpler system implementation.

The DFE 612 computes this "tail" component of the intersymbol interference, based on the tentative decisions $V_{0F}$, $V_{1F}$, and $V_{2F}$. The reason for using three different tentative decisions is that the reliability of the decisions increases with the increasing depth into the path memory. For example, $V_{1F}$ is a more reliable version of $V_{0F}$ delayed by one symbol period. In the absence of errors, $V_{1F}$ would be always equal to a delayed version of $V_{0F}$. In the presence of errors, $V_{1F}$ is different from the delayed version of $V_{0F}$, and the probability of $V_{1F}$ being in error is lower than the probability of $V_{0F}$ being in error. Similarly, $V_{2F}$ is a more reliable delayed version of $V_{1F}$.

Referring to FIG. 15, the DFE 612 is a filter having 33 coefficients $C_0$ through $C_{32}$ corresponding to 33 taps and a delay line 1504. The delay line is constructed of sequentially disposed summing junctions and delay elements, such as registers, as is well understood in the art of filter design. In the illustrated embodiment, the coefficients of the DFE 612 are updated once every four symbol periods, i.e., 32 nanoseconds, in well known fashion, using the well known Least Mean Squares algorithm, based on a decision input 1505 from the Viterbi block and an error input 42*dfe*.

The symbols $V_{0F}$, $V_{1F}$, and $V_{2F}$ are "jammed", meaning inputted at various locations, into the delay line 1504 of the DFE 612. Based on these symbols, the DFE 612 produces an intersymbol interference (ISI) replica portion associated with all previous symbols except the two most recent (since it was derived without using the first two taps of the DFE 612). The ISI replica portion is subtracted from the output 37 of the deskew memory block 36 to produce the signal 1508 which is then fed to the MDFE block. The signal 1508 is denoted as the "tail" component in FIG. 6. In the illustrated embodiment, the DFE 612 has 33 taps, numbered from 0 through 32, and the tail component 1508 is associated with taps 2 through 32. As shown in FIG. 15, due to a circuit layout reason, the tail component 1508 is obtained in two steps. First, the ISI replica associated with taps 3 through 32 is subtracted from the deskew memory output 37 to produce an intermediate signal 1507. Then, the ISI replica associated with the tap 2 is subtracted from the intermediate signal 1507 to produce the tail component 1508.

The DFE 612 also computes the ISI replica 1510 associated with the two most recent symbols, based on tentative decisions $V_{0F}$, $V_{1F}$, and $V_{2F}$. This ISI replica 1510 is subtracted from a delayed version of the output 37 of the deskew memory block 36 to provide a soft decision 43. The tentative decision $V_{0F}$ is subtracted from the soft decision 43 in order to provide an error signal 42. Error signal 42 is further processed into several additional representations, identified as 42enc, 42ph and 42dfe. The error 42enc is provided to the echo cancelers and NEXT cancelers of the constituent transceivers. The error 42ph is provided to the FFEs 26 (FIG. 2) of the four constituent transceivers and the timing recovery block 222. The error 42dfe is directed to the DFE 612, where it is used for the adaptive updating of the coefficients of the DFE together with the last tentative decision V2F from the Viterbi block 1502. The tentative decision 44 shown in FIG. 6 is a delayed version of V0F. The soft decision 43 is outputted to a test interface for display purposes.

The DFE 612 provides the tail component 1508 and the values of the two first coefficients $C_0$ and $C_1$ to the MDFE 602. The MDFE 602 computes eight different replicas of the ISI associated with the first two coefficients of the DFE 612. Each of these ISI replicas corresponds to a different path in the path memory module 608. This computation is part of the so-called "critical path" of the trellis decoder 38, in other words, the sequence of computations that must be completed in a single symbol period. At the speed of operation of the Gigabit Ethernet transceivers, the symbol period is 8 nanoseconds. All the challenging computations for 4D slicing, branch metrics, path extensions, selection of best path, and update of path memory must be completed within one symbol period. In addition, before these computations can even begin, the MDFE 602 must have completed the computation of the eight 4D Viterbi inputs 614 (FIG. 6) which involves computing the ISI replicas and subtracting them from the output 37 of the de-skew memory block 36 (FIG. 2). This bottleneck in the computations is very difficult to resolve. The system of the present invention allows the computations to be carried out smoothly in the allocated time.

Referring to FIG. 15, the MDFE 602 provides ISI compensation to received signal samples, provided by the deskew memory (37 of FIG. 2) before providing them, in turn, to the input of the Viterbi block 1502. ISI compensation is performed by subtracting a set of derived ISI replica components from a received signal sample so as to develop a set of signals that, together, represents various expressions of ISI compensation that may be associated with any arbitrary symbol. One of the ISI compensated arbitrary symbolic representations is then chosen, based on two tentative decisions made by the Viterbi block, as the input signal sample to the Viterbi.

Since the symbols under consideration belong to a PAM-5 alphabet, they can be expressed in one of only 5 possible values (−2, −1, 0, +1, +2). Representations of these five values are stored in a convolution engine 1511, where they are combined with the values of the first two filter coefficients $C_0$ and $C_1$ of the DFE 612. Because there are two coefficient values and five level representations, the convolution engine 1511 necessarily gives a twenty five value results that might be expressed as $(a_i C_0 + b_j C_1)$, with $C_0$ and $C_1$ representing the coefficients, and with $a_i$ and $b_j$ representing the level expressions (with i=1, 2, 3, 4, 5 and j=1, 2, 3, 4, 5 ranging independently).

These twenty five values are negatively combined with the tail component 1508 received from the DFE 612. The tail component 1508 is a signal sample from which a partial ISI component associated with taps 2 through 32 of the DFE 612 has been subtracted. In effect, the MDFE 602 is operating on a partially ISI compensated (pre-compensated) signal sample. Each of the twenty five pre-computed values is subtracted from the partially compensated signal sample in a respective one of a stack of twenty five summing junctions. The MDFE then saturates the twenty five results to make them fit in a predetermined range. This saturation process is done to reduce the number of bits of each of the 1D components of the Viterbi input 614 in order to facilitate lookup table computations of branch metrics. The MDFE 602 then stores the resultant ISI compensated signal samples in a stack of twenty five registers, which makes the samples available to a 25:1 MUX for input sample selection. One of the contents of the twenty five registers will correspond to a component of a 4D Viterbi input with the ISI correctly cancelled, provided that there was no decision error (meaning the hard decision regarding the best path forced upon taps 2 through 32 of the DFE 612) in the computation of the tail component. In the absence of noise, this particular value will coincide with one of the ideal 5-level symbol values (i.e., −2, −1, 0, 1, 2). In practice, there will always be noise, so this value will be in general different than any of the ideal symbol values.

This ISI compensation scheme can be expanded to accommodate any number of symbolic levels. If signal processing were performed on PAM-7 signals, for example, the convolution engine 1511 would output forty nine values, i.e., $a_i$ and $b_j$ would range from 1 to 7. Error rate could be reduced, i.e., performance could be improved, at the expense of greater system complexity, by increasing the number of DFE coefficients inputted to the convolution engine 1511. The reason for this improvement is that the forced hard decision (regarding the best path forced upon taps 2 through 32 of the DFE 612) that goes into the "tail" computation is delayed. If $C_2$ were added to the process, and the symbols are again expressed in a PAM-5 alphabet, the convolution engine 1511 would output one hundred twenty five (125) values. Error rate is reduced by decreasing the tail component computation, but at the expense of now requiring 125 summing junctions and registers, and a 125:1 MUX.

It is important to note that, as inputs to the DFE 612, the tentative decisions $V_{0F}, V_{1F}, V_{2F}$ are time sequences, and not just instantaneous isolated symbols. If there is no error in the tentative decision sequence $V_{0F}$, then the time sequence $V_{2F}$ will be the same as the time sequence $V_{1F}$ delayed by one time unit, and the same as the time sequence VOF delayed by two time units. However, due to occasional decision error in the time sequence $V_{0F}$, which may have been corrected by the more reliable time sequence $V_{1F}$ or $V_{2F}$, time sequences $V_{1F}$ and $V_{2F}$ may not exactly correspond to time-shifted versions of time sequence $V_{0F}$. For this reason, instead of using just one sequence $V_{0F}$, all three sequences $V_{0F}, V_{1F}$ and $V_{2F}$ are used as inputs to the DFE 612. Although this implementation is essentially equivalent to convolving $V_{0F}$ with all the DFE's coefficients when there is no decision error in $V_{0F}$, it has the added advantage of reducing the probability of introducing a decision error into the DFE 612. It is noted that other tentative decision sequences along the depth of the path memory 608 may be used instead of the sequences $V_{0F}$, $V_{1F}$ and $V_{2F}$.

Tentative decisions, developed by the Viterbi, are taken from selected locations in the path memory 608 and "jammed" into the DFE 612 at various locations along its computational path. In the illustrated embodiment (FIG. 15), the tentative decision sequence VOF is convolved with the DFE's coefficients $C_0$ through $C_3$, the sequence $V_{1F}$ is convolved with the DFE's coefficients $C_4$ and $C_5$, and the sequence $V_{2F}$ is convolved with the DFE's coefficients $C_6$ through $C_{32}$. It is noted that, since the partial ISI component that is subtracted from the deskew memory output 37 to form the signal 1508 is essentially taken (in two steps as described above) from tap 2 of the DFE 612, this partial ISI component is associated with the DFE's coefficients $C_2$ through $C_{32}$. It is also noted that, in another embodiment, instead of using the two-step computation, this partial ISI component can be directly taken from the DFE 612 at point 1515 and subtracted from signal 37 to form signal 1508.

It is noted that the sequences $V_{0F}$, $V_{1F}$, $V_{2F}$ correspond to a hard decision regarding the choice of the best path among the eight paths (path i is the path ending at state i). Thus, the partial ISI component associated with the DFE's coefficients $C_2$ through $C_{32}$ is the result of forcing a hard decision on the group of higher ordered coefficients of the DFE 612. The underlying reason for computing only one partial ISI signal instead of eight complete ISI signals for the eight states (as done conventionally) is to save in computational complexity and to avoid timing problems. In effect, the combination of the DFE and the MDFE of the present invention can be thought of as performing the functions of a group of eight different conventional DFEs having the same tap coefficients except for the first two tap coefficients.

For each state, there remains to determine which path to use for the remaining two coefficients in a very short interval of time (about 16 nanoseconds). This is done by the use of the convolution engine 1511 and the MDFE 602. It is noted that the convolution engine 1511 can be implemented as an integral part of the MDFE 602. It is also noted that, for each constituent transceiver, i.e., for each 1D component of the Viterbi input 614 (the Viterbi input 614 is practically eight 4D Viterbi inputs), there is only one convolution engine 1511 for all the eight states but there are eight replicas of the select logic 610 and eight replicas of the MUX 1512.

The convolution engine 1511 computes all the possible values for the ISI associated with the coefficients $C_0$ and $C_1$. There are only twenty five possible values, since this ISI is a convolution of these two coefficients with a decision sequence of length 2, and each decision in the sequence can only have five values (−2, −1, 0, +1, +2). Only one of these twenty five values is a correct value for this ISI. These twenty five hypotheses of ISI are then provided to the MDFE 602.

In the MDFE 602, the twenty five possible values of ISI are subtracted from the partial ISI compensated signal 1508 using a set of adders connected in parallel. The resultant signals are then saturated to fit in a predetermined range, using a set of saturators. The saturated results are then stored in a set of twenty five registers. Provided that there was no decision error regarding the best path (among the eight paths) forced upon taps 2 through 32 of the DFE 612, one of the twenty five registers would contain one 1D component of the Viterbi input 614 with the ISI correctly cancelled for one of the eight states.

For each of the eight states, the generation of the Viterbi input is limited to selecting the correct value out of these 25 possible values. This is done, for each of the eight states, using a 25-to-1 multiplexer 1512 whose select input is the output of the select logic 610. The select logic 610 receives $V_0^{(i)}$ and $V_1^{(i)}$ (i=0, ..., 7) for a particular state i from the path memory module 608 of the Viterbi block 1502. The select logic 610 uses a pre-computed lookup table to determine the value of the select signal 622A based on the values of $V_0^{(i)}$ and $V_1^{(i)}$ for the particular state i. The select signal 622. A is one component of the 8-component select signal 622 shown in FIG. 6. Based on the select signal 622A, the 25-to-1 multiplexer 1512 selects one of the contents of the twenty five registers as a 1D component of the Viterbi input 614 for the corresponding state i.

FIG. 15 only shows the select logic and the 25-to-1 multiplexer for one state and for one constituent transceiver. There are identical select logics and 25-to-1 multiplexers for the eight states and for each constituent transceiver. In other words, the computation of the 25 values is done only once for all the eight states, but the 25:1 MUX and the select logic are replicated eight times, one for each state. The input 614 to the Viterbi decoder 604 is, as a practical matter, eight 4D Viterbi inputs.

In the case of the DFE, however, only a single DFE is needed for practice of the invention. In contrast to alternative systems where eight DFEs are required, one for each of the eight states imposed by the trellis encoding scheme, a single DFE is sufficient since the decision as to which path among the eight is the probable best was made in the Viterbi block and forced to the DFE as a tentative decision. State status is maintained at the Viterbi decoder input by controlling the MDFE output with the state specific signals developed by the 8 select logics (610 of FIG. 6) in response to the eight state specific signals $V_0^i$ and $V_1^i$, i=0, ..., 7, from the path memory module (608 of FIG. 6). Although identified as a singular DFE, it will be understood that the 4D architectural requirements of the system means that the DFE is also 4D. Each of the four dimensions (twisted pairs) will exhibit their own independent contributions to ISI and these should be dealt with accordingly. Thus, the DFE is singular, with respect to state architecture, when its 4D nature is taken into account.

In the architecture of the system of the present invention, the Viterbi input computation becomes a very small part of the critical path since the multiplexers have extremely low delay due largely to the placement of the 25 registers between the 25:1 multiplexer and the saturators. If a register is placed at the input to the MDFE 602, then the 25 registers would not be needed. However, this would cause the Viterbi input computation to be a larger part of the critical path due to the delays caused by the adders and saturators. Thus, by using 25 registers at a location proximate to the MDFE output instead of using one register located at the input of the MDFE, the critical path of the MDFE and the Viterbi decoder is broken up into 2 approximately balanced components. This architecture makes it possible to meet the very demanding timing requirements of the Gigabit Ethernet transceiver.

Another advantageous factor in achieving high-speed operation for the trellis decoder 38 is the use of heavily truncated representations for the metrics of the Viterbi decoder. Although this may result in a mathematically nonzero decrease in theoretical performance, the resultant vestigial precision is nevertheless quite sufficient to support healthy error margins. Moreover, the use of heavily truncated representations for the metrics of the Viterbi decoder greatly assists in achieving the requisite high operational speeds in a gigabit environment. In addition, the reduced precision facilitates the use of random logic or simple lookup tables to compute the squared errors, i.e., the distance metrics, consequently reducing the use of valuable silicon real estate for merely ancillary circuitry.

FIG. 16 shows the word lengths used in one embodiment of the Viterbi decoder of this invention. In FIG. 16, the word lengths are denoted by S or U followed by two numbers separated by a period. The first number indicates the total number of bits in the word length. The second number indicates the number of bits after the decimal point. The letter S denotes a signed number, while the letter U denotes an unsigned number. For example, each 1D component of the 4D Viterbi input is a signed 5-bit number having 3 bits after the decimal point.

FIG. 17 shows an exemplary lookup table that can be used to compute the squared 1-dimensional errors. The logic function described by this table can be implemented using read-only-memory devices, random logic circuitry or PLA circuitry. Logic design techniques well known to a person of ordinary skill in the art can be used to implement the logic function described by the table of FIG. 17 in random logic.

FIGS. 18A and 18B provide a more complete table describing the computation of the decisions and squared errors for both the X and Y subsets directly from one component of the 4D Viterbi input to the 1D slicers (FIG. 7). This table completely specifies the operation of the slicers of FIG. 7.

In addition to the exemplary architecture of the trellis decoder 38 (FIG. 2) described above, other embodiments will be described. These embodiments present different ways of resolving the problem of timing bottleneck in the "critical path" of the trellis decoder 38.

Figure 24:
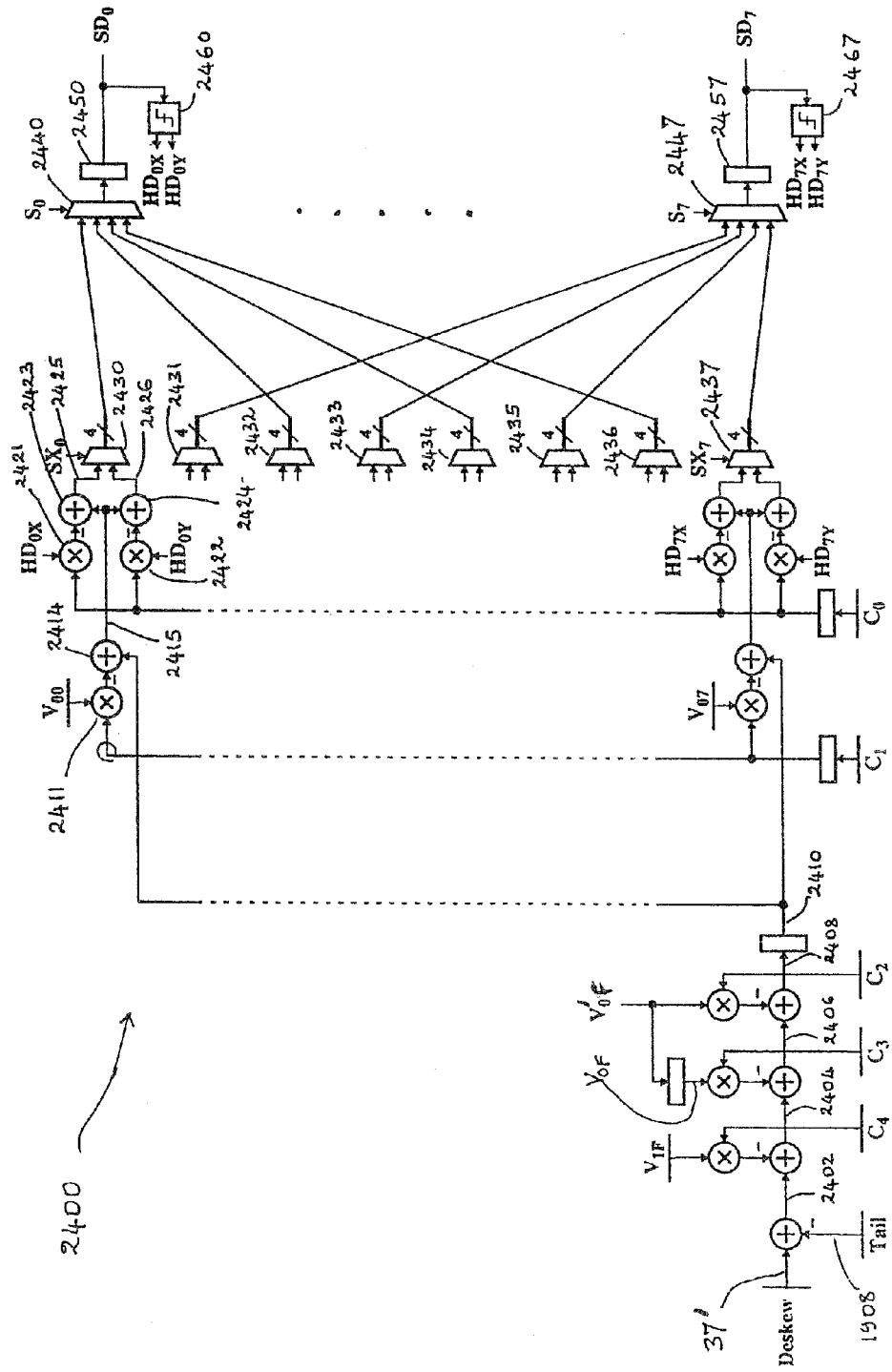
FIG. 24 is a simplified diagram of one embodiment of the MDFE 1902 (FIG. 19).
Figure 25:
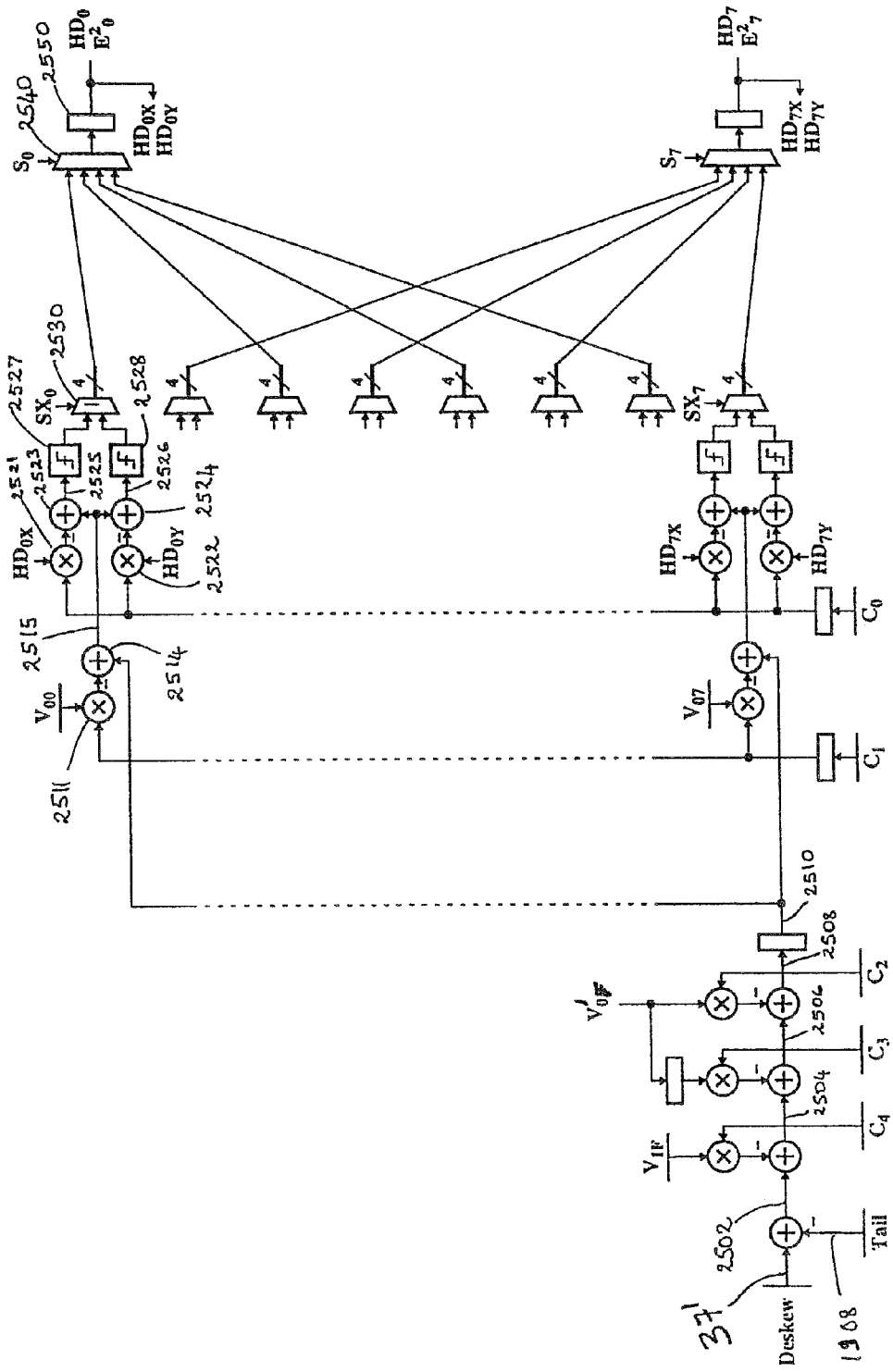
FIG. 25 is a simplified diagram of another embodiment of the MDFE 1902 (FIG. 19).

The so-called "critical path" of the trellis decoder 38 is the sequence of computations that must be completed in a single symbol period. At the speed of operation of the Gigabit Ethernet transceivers, the symbol period is 8 nanoseconds. All the challenging computations for 4D slicing, branch metrics, path extensions, selection of best path, and update of path memory must be completed within one symbol period. In addition, before these computations can even begin, the MDFE 602 must have completed the computation of the eight 4D Viterbi inputs 614 (FIG. 6) which involves computing the ISI replicas and subtracting them from the output 37 of the de-skew memory block 36 (FIG. 2). This timing bottleneck in the computations is very difficult to resolve. The MDFE of FIG. 15 which allows the computations to be carried out smoothly in the allocated time has been described. The MDFE embodiments 2400, 2500 shown in FIGS. 24 and 25 provide different architectures that also effectively resolve the timing bottleneck problem. These embodiments can be used for the MDFE 1902 shown in FIG. 19.

Figure 19:
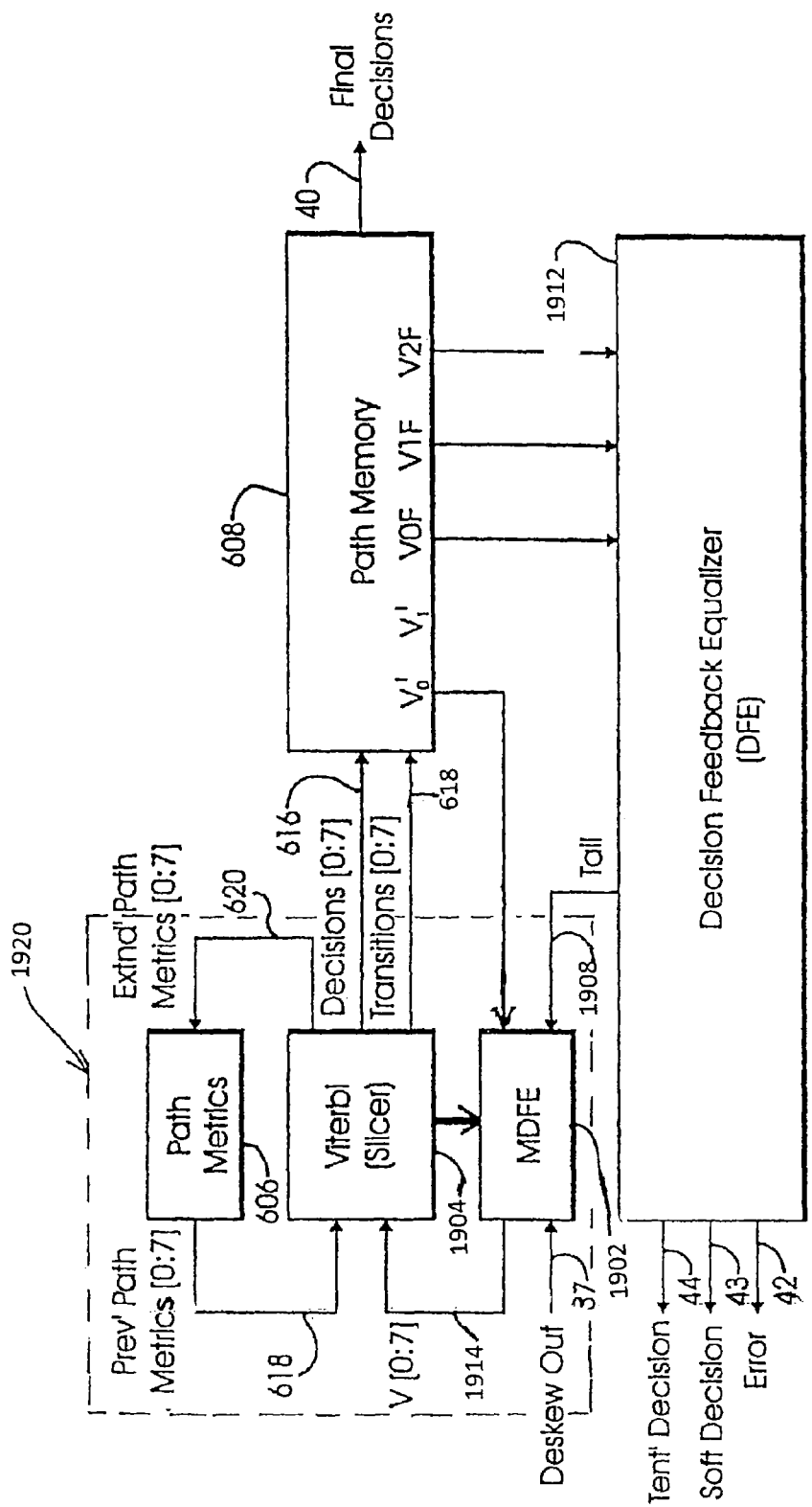
FIG. 19 is a simplified block diagram of another embodiment of the exemplary trellis decoder 38 (FIG. 2).

FIG. 19 is a simplified block diagram of another embodiment of the exemplary trellis decoder 38 (FIG. 2). In this embodiment 1900, the trellis decoder 38 includes a multiple decision feedback equalizer (MDFE) 1902, Viterbi decoder circuitry 1904, a path metrics module 606, a path memory module 608, and a decision feedback equalizer 1912. In general, a Viterbi decoder is often thought of as including the path metrics module and the path memory module. However, because of the unique arrangement and functional operation of the elements of the exemplary trellis decoder 38, the functional element which performs the slicing operation will be referred to herein as Viterbi decoder circuitry or a Viterbi decoder.

The main difference between the embodiment 1900 and the embodiment 600 (FIG. 6) is that the Viterbi decoder 1904 with its associated path metrics module 606 and the MDFE 1902 form an integrated function block 1920 in which the architecture of the MDFE 1902 allows utilization of results produced by the Viterbi decoder 1904 in look-ahead computations. The MDFE 1902 computes all possible candidates for the Viterbi inputs 1914, while, concurrently, the Viterbi decoder 1904 computes the intermediate 4D decisions, from which the decisions 616 are derived, and the Path Select signals 618. The decisions 616 and Path Select signals 618 are used by the path memory 608 to update the next-cycle path memory symbols, which include $V_0^{(i)}$, i=0, . . . , 7. The results produced by the Viterbi decoder 1904, which include the intermediate 4D decisions, the select signals which are used to select the 4D decisions from the intermediate 4D decisions, and the Path Select signals 618, are provided to the MDFE 1902. The MDFE 1902 uses these inputs to select the appropriate Viterbi inputs from the computed possible candidates. These Viterbi inputs will be used by the Viterbi decoder 1904 to compute the decisions 616 and Path Select signals 618 for the next cycle, i.e., the next symbol period.

The signals provided by the Viterbi decoder 1904 to the MDFE 1902 can be wired out from the Viterbi decoder 1904. However, in certain layout configuration, this could cause some problems due to the number and length of wires. Since the slicing functions of the Viterbi decoder 604 do not take much real estate and power consumption, they can be duplicated in the MDFE 1902 with negligible effect on performance.

In one embodiment of the function block 1920, the slicing functions of the Viterbi decoder 604 are duplicated in the MDFE 1902 to produce the 4D intermediate decisions, the select signals which are used to select the 4D decisions from the intermediate 4D decisions, and the Path Select signals 618.

In another embodiment of the function block 1920, the slicing functions of the Viterbi decoder are integrated in the MDFE 1902, and are absent in the Viterbi decoder 604. In this case, the functions in the Viterbi decoder 604 are reduced to selecting the 4D decisions from the intermediate 4D decisions produced by the slicing functions and updating the path memory.

These embodiments of the function block 1920 will be described in detail. In order to clearly describe these embodiments, the architecture of the Viterbi decoder 604 and the path memory module 608 will be revisited first, in a slightly different presentation.

Figure 20:
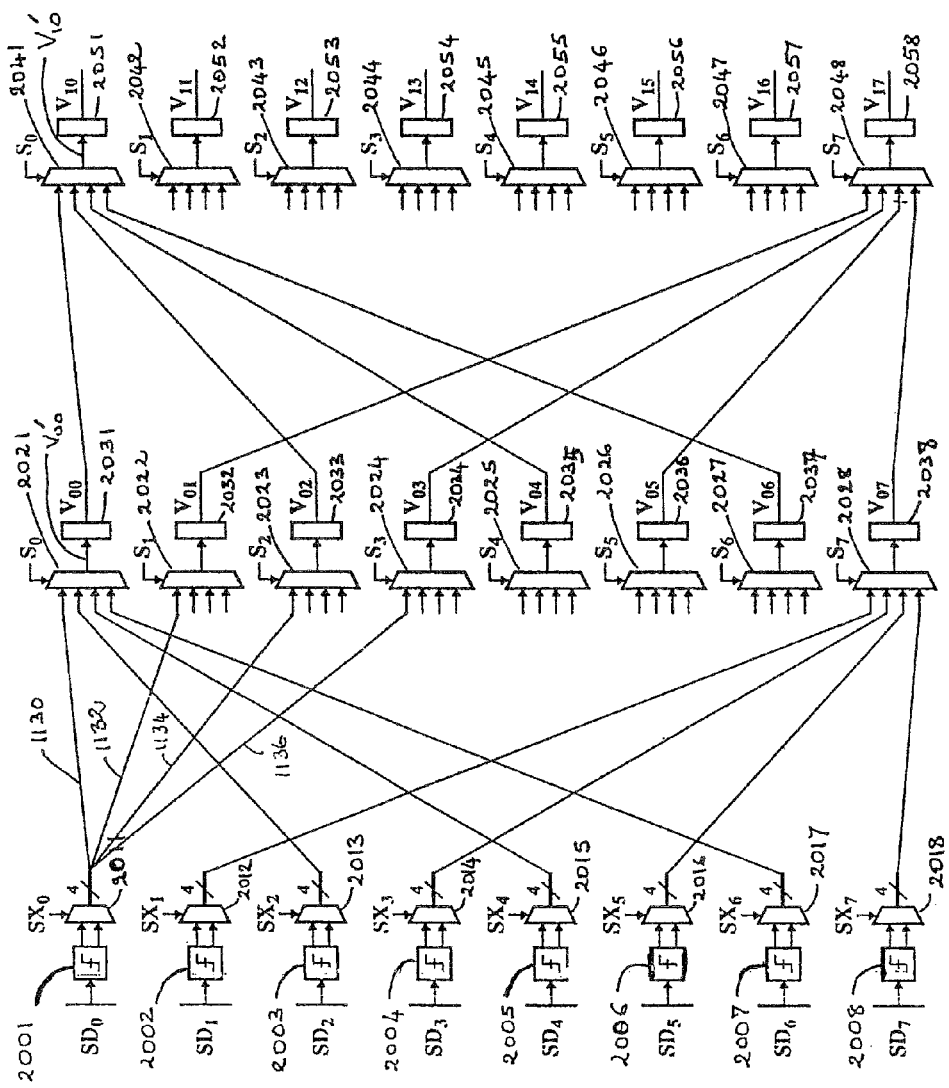
FIG. 20 is a block diagram illustrating the data flow in the Viterbi decoder 604 and the path memory module 608.

FIG. 20 is a block diagram illustrating the data flow in the Viterbi decoder 604 and the path memory module 608. In FIG. 20, for simplicity, the Viterbi decoder 604 is represented as eight slicer blocks 2001, 2002, 2003, 2004, 2005, 2006, 2007, 2008, and eight associated multiplexers 2011, 2012, 2013, 2014, 2015, 2016, 2017, 2018. It is understood that each of the eight slicer blocks performs the slicing functions that are previously described in conjunction with FIG. 7 (or 8), FIGS. 9, 10, 11 and 12. The data flow depicted in FIG. 20 has the same general pattern as that of the trellis transitions shown in the trellis diagram of FIG. 5. For clarity and simplicity of illustration, only a portion of the data flow pattern is shown in FIG. 20. The data flow from slicer block 2001 will be described in detail. It is understood that the data flows from the other slicer blocks 2002-2008 are similar to the one from slicer block 2001 and are in accordance with the pattern of the trellis diagram of FIG. 5.

Each of the eight slicer blocks outputs 4 pairs of intermediate 4D decisions, corresponding to the sub-subsets of the corresponding code-subsets. The outputs of the eight slicer blocks are provided to multiplexer blocks 2011 through 2018. Each of these multiplexer blocks represents 4 multiplexers.

For example, the slicer block 2001, associated with state 0, outputs 4 pairs of intermediate 4D decisions. The 4 pairs of intermediate 4D decisions correspond to the 4 code-subsets S0, S2, S4, S6, respectively (FIG. 4B). Referring to FIG. 11, the 4 pairs of intermediate 4D decisions outputted from slicer block 2001 are shown as the outputs of the eight concatenate blocks.

Each of the eight slicer blocks also outputs a 4D select signal $SX_i$ (with i=0, . . . , 7). For example, the slicer block 2001, associated with state 0, outputs the 4D select signal 8Xo which represents the four 1D select signals 1026, 1028, 1030, 1032 of FIG. 10. For simplicity of illustration, the multiplexer block 2011 represents the 4 multiplexers 1120, 1122, 1124, 1126 of FIG. 11. The 1D select signals 1026, 1028, 1030, 1032 are used as inputs to the 4 multiplexers of the multiplexer block 2011 to select one 4D decision from each of the 4 pairs of intermediate 4D decisions as an output to a corresponding successor state in the trellis. Referring to FIG. 11, the 4D decisions 1130, 1132, 1134, 1136 are provided to trellis successor states 0, 1, 2, 3, respectively. In FIG. 20, these 4D decisions, denoted by the same reference numerals, are provided to the multiplexers 2021, 2022, 2023, 2024, which are associated with the successor states 0, 1, 2, 3, respectively.

The multiplexer 2021, associated with trellis successor state 0, represents the multiplexer denoted by 1302 in FIG. 13. The multiplexer 2021 selects one of the four 4D decisions based on the select input $S_0$, which represents the path 0 select signal 1206 in FIG. 12 and FIG. 13, and outputs the selected decision to register 2031. The register 2031 represents the path 0 register 0 of FIG. 13. The output of register 2031, denoted by $V_{00}$ to indicate that it comes from register 0 of path 0, is provided to multiplexers 2041, 2042, 2043, 2044 which are associated with the next successor states 0, 1, 2, 3, respectively. The multiplexer 2041 represents the multiplexer 1304 of FIG. 13.

Similarly, the multiplexers 2022, 2023, 2024, 2025, 2026, 2027, 2028 are associated with trellis successor states 1, 2, 3, 4, 5, 6, 7, respectively. These multiplexers select one of their respective four inputs based on the respective select input $S_i$, $i \in \{1, \ldots, 7\}$, which represents the select signal for path i, and output the selected decisions to registers 2032, 2033, 2034, 2035, 2036, 2037, 2038, respectively. The select input $S_i$, $i \in \{1, \ldots, 7\}$, is computed similarly as $S_0$, i.e., the path 0 select signal 1206 described in FIG. 12. The outputs of registers 2031-2038 are denoted by $V_{00}$ through $V_{07}$, respectively, to indicate that the outputs come from registers 0 of paths i, i= 1, . . . , 7, respectively. The outputs $V_{00}$ through $V_{07}$ are provided to multiplexers 2041-2048 in accordance with the trellis diagram of FIG. 5.

The same select signals $S_i$, i=0, . . . , 7, are used by the multiplexers 2041-2048, and by the multiplexers at higher depth levels in the path memory as shown in FIG. 13. The multiplexers 2041-2048 select one of their respective four inputs based on the respective select input $S_i$, $i \in \{0, \ldots, 7\}$, which represents the select signal for path i, and output the selected decisions to registers 2051, 2052, 2053, 2054, 2055, 2056, 2057, 2058, respectively. The outputs of registers 2051-2058 are denoted by $V_{10}$ through $V_{17}$, respectively, to indicate that the outputs come from registers 1 of paths i, i=0, . . . , 7, respectively. The outputs $V_{10}$ through $V_{17}$ are provided to multiplexers of higher depth level in accordance with the trellis diagram of FIG. 5.

Figure 21:
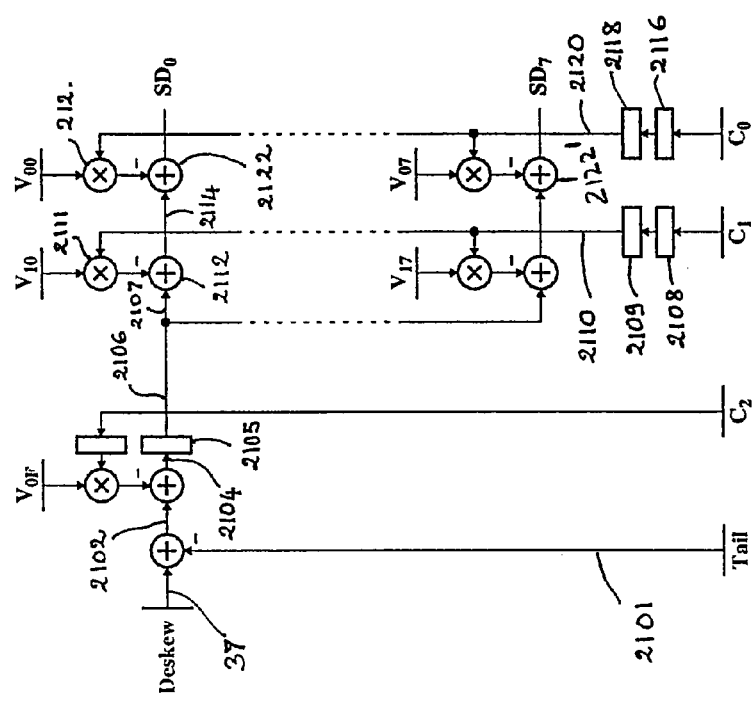
FIG. 21 illustrates a straight forward implementation of the MDFE which would provide the Viterbi inputs to the Viterbi decoder, but may not work under strict constraint on the symbol period, such as the one imposed on the gigabit Ethernet transceiver system.

FIG. 21 illustrates a straight forward implementation of the MDFE which would provide the Viterbi inputs to the Viterbi decoder, but may not work under strict constraint on the symbol period, such as the one imposed on the gigabit Ethernet transceiver system. This architecture is discussed first so that the novel features of the other embodiments of the MDFE 1902 can be clearly presented later.

The MDFE functions to provide eight 4D signal samples $\{SD_i, i=0, \ldots, 7\}$ to the eight input nodes of the Viterbi decoder, the eight input nodes corresponding to the 8 states. These eight 4D signal samples correspond to a received 4D signal sample that has been ISI compensated. In other words, they correspond to a received 4D signal sample from which the ISI component as estimated by the DFE and MDFE have been subtracted.

Referring to FIG. 21, the ISI tail signal 2101 (FIG. 15) provided by the DFE 612 (FIG. 15) is a partial ISI component associated with taps 3 through the last tap (tap 32 in one embodiment) of the DFE 612. The ISI tail signal 2101 is subtracted from the deskew signal 37 to produce the signal 2102 which, in effect, is a partially ISI compensated signal sample. The DFE coefficient $C_2$ is multiplied by the tentative decision $V_{0F}$, previously described in connection with FIG. 14, to produce an estimate of the ISI component associated with tap 2 of the DFE 612. This ISI estimate associated with $C_2$ is then subtracted from the signal 2102 to produce the signal 2104. The signal 2104 is delayed by one time period to produce the signal 2106. Thus, the signal 2106 is a signal sample from which a partial ISI component associated with taps 2 through the last tap (tap 32 in one embodiment) of the DFE 612 has been subtracted.

The DFE coefficient $C_1$ is delayed by two time periods via registers 2108 and 2109 then multiplied by each value in the set $\{V_{10}, V_{11}, V_{12}, \ldots, V_{17}\}$ to form all possible ISI estimates associated with $C_1$. The values $V_{00}, V_{01}, V_{02}, \ldots, V_{07}$ are outputs of the registers 2051-2058 (FIG. 20).

The 8 possible ISI estimates associated with $C_0$ are then subtracted from the signal 2106. For example, the ISI estimate formed by multiplying signal 2110, i.e., the twice-delayed $C_1$, with $V_{10}$ via multiplier 2111 is subtracted from the signal 2106 via adder 2112 to form the signal 2114. It is understood to one skilled in the art that similar operations are concurrently performed on the other 7 ISI estimates associated with $C_1$.

The DFE coefficient $C_0$ is delayed by two time periods via registers 2116 and 2118 then multiplied by each value in the set $\{V_{00}, V_{01}, V_{02}, \ldots, V_{07}\}$ to form all possible ISI estimates associated with $C_0$. The values $V_{00}, V_{01}, V_{02}, \ldots, V_{07}$ are outputs of the registers 2031-2038 (FIG. 20).

The 8 possible ISI estimates associated with $C_0$ are then subtracted from respective signals via eight adders (only two of which are shown, namely 2122 and 2122'). For example, the ISI estimate formed by multiplying signal 2120, i.e., the twice-delayed $C_0$, with $V_{00}$ via multiplier 2121 is subtracted from the signal 2114 via adder 2122 to form $SD_0$, the Viterbi input corresponding to trellis state 0. The ISI estimate formed by multiplying the twice-delayed $C_0$, with $V_{07}$ is subtracted from a signal 2113 via adder 2122 to form $SD_7$, the Viterbi input corresponding to trellis state 7. It is understood to one skilled in the art that similar operations are performed on the other 6 ISI estimates associated with $C_0$ to produce the other 6 Viterbi inputs $SD_1, \ldots, SD_6$.

Although the embodiment 2100 of the MDFE produces the required Viterbi inputs $SD_i$, i=0, . . . , 7, the fact that there are no registers at the outputs of MDFE 2100 implies that the MDFE 2100 has to compute and provide the Viterbi inputs $SD_i$, i=0, . . . , 7, to the Viterbi decoder in the same symbol period where the $SD_i$ are processed by the Viterbi decoder in its slicing and updating path memory functions. In other words, using the architecture of the MDFE 2100, the critical path of computations of the trellis decoder 38 (FIG. 2) is not broken into balanced components. This MDFE 2100 architecture would cause severe timing bottleneck between the Viterbi decoder and the equalizer formed by the MDFE 2100 and the DFE. A technique known as "retiming" can be used to modify the architecture of embodiment 2100 to allow the breakup of the critical path of computations, without affecting its functions.

Figure 22:
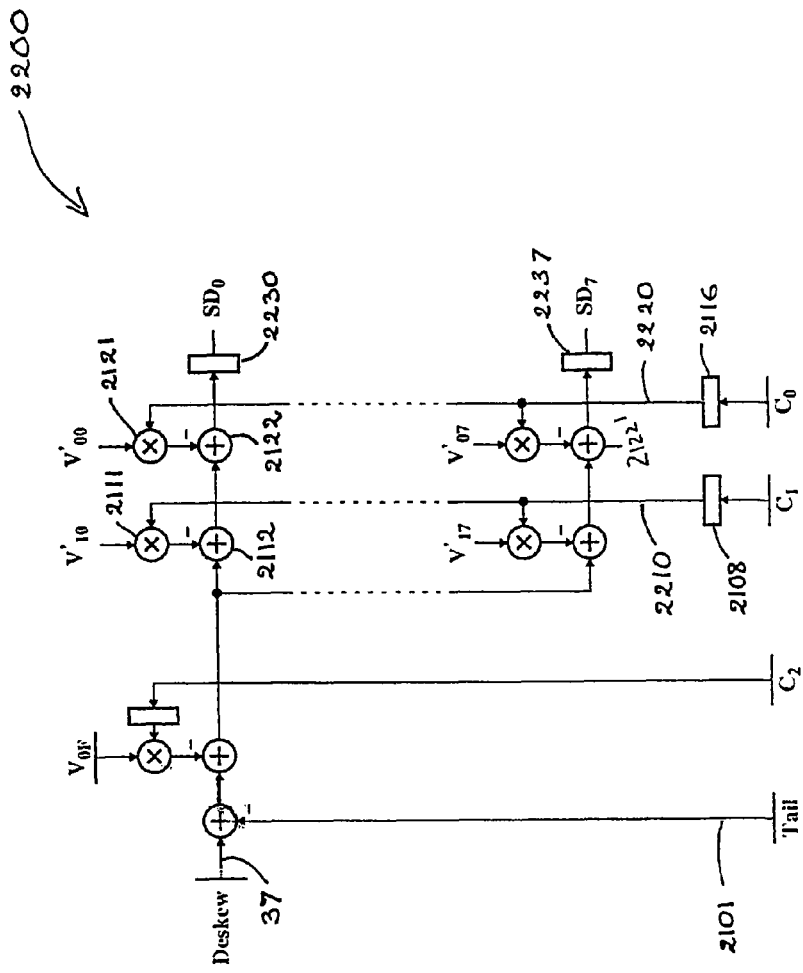
FIG. 22 is a diagram of the embodiment resulting from retiming the architecture of the MDFE depicted in FIG. 21.

FIG. 22 is a diagram of the embodiment resulting from retiming the architecture of the MDFE depicted in FIG. 21. Embodiment 2200 is functionally equivalent to embodiment 2100 of FIG. 21, but provides the buffering of the eight MDFE outputs to break up the critical path of computations of the MDFE and Viterbi block (which includes the Viterbi decoder and the associated path metrics module and path memory module).

Retiming technique involves "pushing" a register further down a data path so that the register value resulting from computations performed, in a symbol period, upstream from the input of the register, is used downstream from the output of the register in the next symbol period. In order to preserve the transfer function of a circuit, retiming technique requires the following. When a register is pushed down a path that forks into two downstream branches in the original circuit, the pushed register will appear as a register in each of the two downstream branches In the retimed circuit. Conversely, for the retiming of two upstream branches that merge into a single downstream path, there must be a register at the input of each of the two upstream branches in the original circuit in order for the single downstream path in the retimed circuit to have a register.

Referring to FIG. 21, in order to have the register 2230 (FIG. 22) in the retimed circuit 2200, there must be, in the original circuit 2100, a register at each of the two inputs of adder 2122, i.e., at the output of multiplier 2121 and at the output of adder 2112.

In order to have a register at the output of multiplier 2121, there must be a register at each of the two inputs of multiplier 2121. Pushing the register 2118 and the register which outputs $V_{00}$ past multiplier 2121 can achieve this. However, pushing the register which outputs $V_{00}$ past multiplier 2121 corresponds to using $V'_{00}$ (FIG. 20) instead of $V_{00}$ which is the one-symbol-period delayed version of $V'_{00}$.

In order to have a register at the output of adder 2112, there must be a register at each of the two inputs of adder 2112. The first input 2107 of adder 2112 is connected in parallel to inputs of adders associated with $V_{1i}$, i=1, ..., 7. In order to have a register at input 2107, the register 2105 can be pushed so that there is a register at the input 2107 and at each of the first inputs of adders associated with $V_{1i}$, i=1, ..., 7.

The second input of adder 2112 corresponds to the output of multiplier 2111. In order to have a resultant register at the output of multiplier 2111, there must be a register at each of the two inputs of multiplier 2111. $V_{10}$ is the output of register 2051 (FIG. 20). Thus, there is a register at the first input of multiplier 2111. However, pushing the register which outputs $V_{10}$ past multiplier 2111 corresponds to using $V'_{10}$ (FIG. 20) instead of $V_{10}$, where $V_{10}$ is the one-symbol-period delayed version of $V'_{10}$. In order to have a register at the second input of multiplier 2111, the register 2109 can be pushed so that there is a register at the second input of each of the multipliers that are respectively associated with $V_{1i}$, i=0, ..., 7.

It is understood to one skilled in the art that the above discussion regarding retiming to obtain register 2230 (FIG. 22) to buffer the output $SD_0$ is applicable to the other outputs $SD_i$, i=1, ..., 7.

The retiming technique performed on the system of FIG. 21 has been described in detail. The system 2200 of FIG. 22 is the resultant retimed system which has the same transfer function as the system 2100 of FIG. 21, but has the advantage of allowing the breakup of the critical path of the trellis decoder 38 (FIG. 2), as discussed previously.

Although the system 2200 allows the breakup of the critical path of computations into two portions, the first portion comprising computations in the Viterbi decoder and its associated path metrics and path memory modules, the second portion comprising computations in the DFE and MDFE, computing the ISI components associated with the DFE coefficients $C_0$, $C_1$ and subtracting them from the partially ISI compensated signal 2104 according to the architecture of system 2200 may still cause some timing bottleneck.

Figure 23:
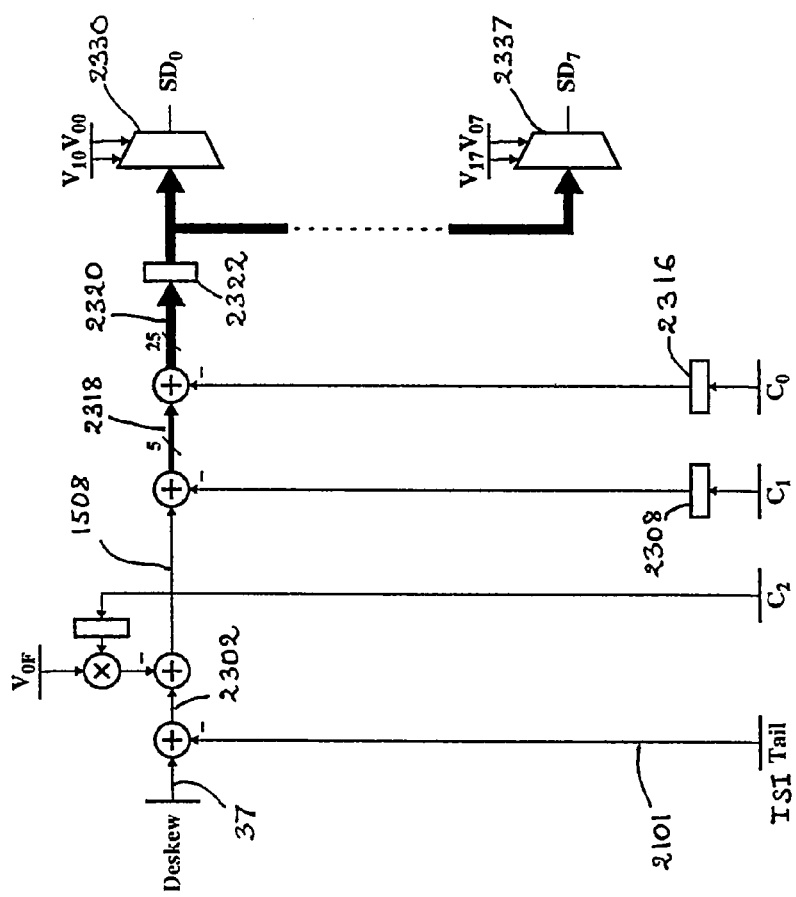
FIG. 23 is a simplified diagram illustrating the architecture of the MDFE previously discussed in connection with FIG. 15.

FIG. 23 is a simplified diagram illustrating the architecture of the MDFE previously discussed in connection with FIG. 15. This architecture allows alleviation of the timing bottleneck that may occur with system 2200 of FIG. 22.

Referring to FIG. 23, the ISI tail signal 2101, which is the partial ISI component associated with taps 3 through the last tap (tap 32 in one embodiment) of the DFE 612 (FIG. 15), is subtracted from the deskew signal 37 (FIG. 2) to produce the signal 2302.

The DFE 612 (FIG. 15) coefficient C2 is delayed by one symbol period then multiplied by the tentative decision $V_{0F}$, previously described in connection with FIG. 14, to produce an estimate of the ISI component associated with tap 2 of the DFE 612. This ISI estimate associated with $C_2$ is then subtracted from the signal 2302 to produce the signal 1508 (FIG. 15). The signal 1508 represents a signal sample from which a partial ISI component associated with taps 2 through the last tap (tap 32 in one embodiment) of the DFE 612 has been subtracted.

The DFE coefficient $C_1$ is delayed by one symbol period via register 2108 then multiplied by each PAM-5 value in the set $\{-2, -1, 0, 1, 2\}$. The resultant 5 values are subtracted from the signal 1508 to form the five signals 2318. FIG. 23 shows a short-hand representation of this process.

The DFE coefficient $C_0$ is delayed by one symbol period via register 2316 then multiplied by each PAM-5 value in the set $\{-2, -1, 0, 1, 2\}$. The resultant 5 values are subtracted from the five signals 2318 in all possible combinations to form the twenty-five signals 2320. FIG. 23 shows a short-hand representation of this process.

A register delays each of the 25 signals 2320. These registers, denoted as register block 2322, serve the purpose of breaking up the critical path of the trellis decoder. They correspond to the registers located at the input of the 25:1 MUX block 1512 in FIG. 15. The 25 signals outputted from the register block 2322 are inputted to eight 25:1 multiplexers 2330-2337. Each of the eight multiplexers 2330-2337 selects one of the 25 signals as a Viterbi input $S_i$ for trellis state i (i= 0, ..., 7), based on the two signals $V_{0i}$ and $V_{1i}$, i=0, ..., 7.

This architecture makes it possible to meet the very demanding timing requirements of the Gigabit Ethernet transceiver. This is due largely to the advantages of pre-computing the 25 ISI possible values associated with $C_0$ and $C_1$ and of the placement of the 25 registers 2322. These advantages have been discussed in detail in connection with FIG. 15.

FIG. 24 and FIG. 25 illustrate other architectures of the MDFE that also make it possible to meet the very demanding timing requirements of the Gigabit Ethernet transceiver.

FIG. 24 is a simplified diagram of one embodiment of the MDFE 1902. In this embodiment 2400, instead of multiplying the coefficient $C_1$ by $V'_{10}$ through $V'_{17}$, and $C_0$ by $V'_{00}$ through $V'_{07}$ to compute the Viterbi inputs $SD_0$ through $SD_7$, the MDFE 1902 computes all the possible candidates for the Viterbi inputs (also called soft decisions in some literature) using the intermediate 4D decisions produced by the Viterbi decoder 1904, and uses the select signals $SX_i$, i=0, ..., 7, and the path select signals $S_i$, i=0, ..., 7, also produced by the Viterbi decoder 1904, to select the appropriate Viterbi inputs from the possible candidates. This is possible for the following reasons.

Referring to FIG. 20, $V'_{10}$ is selected from the values $V_{00}$, $V_{02}$, $V_{04}$, $V_{06}$ based on the path select signal $S_0$. Thus, $V_{00}$, $V_{02}$, $V_{04}$, $V_{06}$ can be used instead of $V'_{10}$ in the multiplication by the coefficient $C_1$ in the MDFE 1902 as long as the same selection mechanism, which is based on the path select signal $S_0$, is provided. Similar argument can be applied to the other $V'_{1i}$, i=1, ..., 7.

Referring to FIG. 20, $V'_{10}$ is selected from the outputs of the multiplexers 2011-2018 based on the path select signal $S_0$. The outputs of the multiplexers 2011-2018 are selected, based on the select signals $SX_0$, $SX_2$, $SX_4$, $SX_6$, from the intermediate 4D decisions which result from slicing $SX_0$, $SX_2$, $SX_4$, $SX_6$. Thus, the intermediate 4D decisions which result from slicing $SX_0$, $SX_2$, $SX_4$, $SX_6$ can be used instead of $V'_{00}$ in the multiplication by the coefficient $C_0$ in the MDFE 1902 as long as the same two selection processes are provided, the first selection process being based on the select signals $SX_0$, $SX_2$, $SX_4$, $SX_6$, the second selection process being based on the path select signal S0. Similar argument can be applied to the other $V'_{0i}$, i=1, ..., 7.

Referring to FIG. 24, the tail signal 1908 is provided by the DFE 1912 (FIG. 19). The tail signal 1908 represents a partial ISI component associated with taps 5 through the last tap (tap 32 in one embodiment) of the DFE 1912. The generation of the tail signal 1908 will be described in connection with FIG. 26. The tail signal 1908 is subtracted from a deskew signal 37' (the one-symbol period earlier version of signal 37) to produce the signal 2402 which, in effect, is a partially ISI compensated signal sample. The DFE coefficient $C_4$ is multiplied by the tentative decision $V_{1F}$, previously described in connection with FIG. 14, to produce an estimate of the ISI component associated with tap 4 of the DFE 1912. This ISI estimate associated with $C_4$ is then subtracted from the signal 2402 to produce the signal 2404. The DFE coefficient $C_3$ is multiplied by the tentative decision $V_{0F}$, previously described in connection with FIG. 14, to produce an estimate of the ISI component associated with tap 3 of the DFE 1912. This ISI estimate associated with $C_3$ is then subtracted from the signal 2404 to produce the signal 2406. The DFE coefficient $C_2$ is multiplied by the tentative decision $V^1_{0F}$, which is a one-symbol-period earlier version of $V_{0F}$, to produce an estimate of the ISI component associated with tap 2 of the DFE 1912. This ISI estimate associated with $C_2$ is then subtracted from the signal 2406 to produce the signal 2408. The signal 2408 is delayed by one time period to produce the signal 2410. Thus, the signal 2410 is a signal sample from which a partial ISI component associated with taps 2 through the last tap (tap 32 in one embodiment) of the DFE 1912 has been subtracted.

The MDFE 1902 of FIG. 24 differs, in one way, from the MDFE of FIG. 22 in that a retiming technique is performed on the MDFE of FIG. 22 to result in MDFE 1902 of FIG. 24. A register associated with the deskew block 36 is taken from that block and then retimed so as to push the register past the respective adders associated with coefficients $C_4$, $C_3$ and $C_2$ so that it receives as input signal 2408 and outputs delayed signal 2410. Thus, the deskew signal received by the MDFE 1902 is actually the one symbol period earlier signal 37', and not 37 as in FIG. 23.

Figure 26:
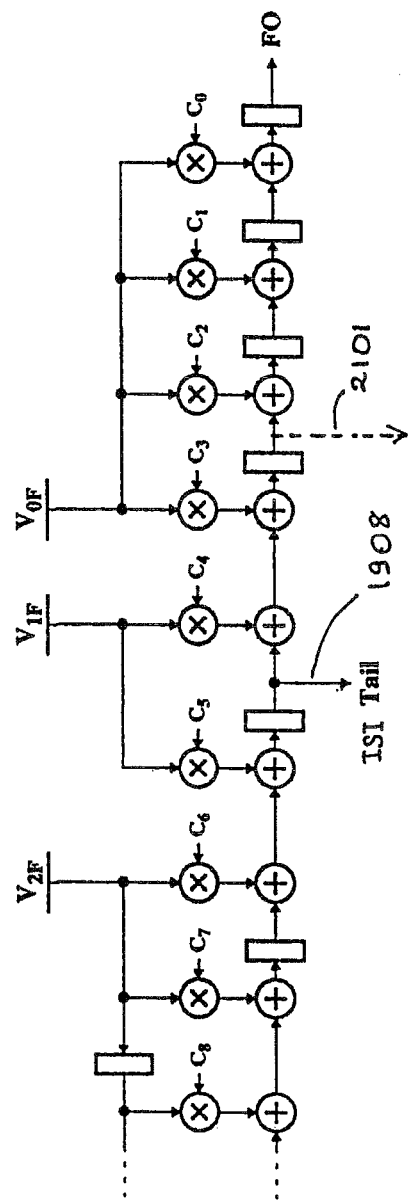
FIG. 26 is a detailed diagram of an exemplary structure of the DFE 1912 (FIG. 19).

Moreover, the MDFE 1902 of FIG. 24 receives tail signal 1908 (FIG. 26), which is the partial ISI component associated with taps 5 through the last tap (tap 32 in one embodiment) of the DFE of FIG. 26. The retiming technique performed on MDFE 1902 also results in a change to the structure of the DFE, such that the ISI signal introduced to MDFE 1902 is signal 1908, and not signal 2101 (FIG. 26). Thus, MDFE 1902 also includes circuitry to replicate the calculations for the ISI components associated with coefficients $C_3$ and $C_4$. This is beneficial because the calculations in the DFE are often performed at a lower voltage than in MDFE 1902, and are therefore slower than when performed by MDFE 1902.

The DFE coefficient $C_1$ is multiplied by each value in the set $\{V_{00}, V_{01}, V_{02}, \ldots, V_{07}\}$ to form all possible ISI estimates associated with $C_1$. The values $V_{00}, V_{01}, V_{02}, \ldots, V_{07}$ are outputs of the registers 2031-2038 (FIG. 20). As previously discussed, $V_{00}, V_{01}, V_{02}, \ldots, V_{07}$ can be used instead of $V'_{1i}$, i=1, ..., 7, in the multiplication by the coefficient $C_1$ in the MDFE 1902 a the selection process based on the path select signal $S_i$, i=0, ..., 7, that is used to derive $V'_{1i}$, i=1, ..., 7, from $V_{00}, V_{01}, V_{02}, \ldots, V_{07}$, is subsequently provided.

The possible ISI estimates associated with $C_1$ are then subtracted from the signal 2410. For example, the ISI estimate formed by multiplying $C_1$ with $V_{00}$ via multiplier 2411 is subtracted from the signal 2410 via adder 2414 to form the signal 2415. It is understood that similar operations are performed on the other 7 ISI estimates associated with $C_1$.

The DFE coefficient $C_0$ is multiplied by each value in the set $\{HD_{iX}, HD_{iY}, \text{with } i=0, \ldots, 7\}$ to form all possible ISI estimates associated with $C_0$. The values $\{HD_{iX}, HD_{iY}, \text{with } i=0, \ldots, 7\}$ are intermediate 4D decisions and are outputs of the slicer blocks 2001-2008 (FIG. 20). It is noted that each $\{HD_{iX}, HD_{iY}\}$ represents four pairs of intermediate 4D decisions. As previously discussed, these intermediate 4D decisions resulting from slicing $SD_0$-$SD_7$ can be used instead of $V'_{0i}$, i=0, ..., 7, in the multiplication by the coefficient $C_0$ in the MDFE 1902 as long as the two selection processes that are used to derive $V'_{0i}$, i=1, ..., 7, from the intermediate 4D decisions $\{HD_{iX}, HD_{iY}, \text{with } i=0, \ldots, 7\}$ are subsequently provided. The first selection process is based on the select signals $SX_i$, i=0, ..., 7. The second selection process is based on the path select signal $S_i$, i=0, ..., 7.

The processing of all the possible ISI estimates associated with $C_0$ is similar for all the 8 pairs of branches. Only one pair of branches will be described in detail. This description is applicable to the other pairs of branches.

The ISI estimates that are formed by multiplying $C_0$ with $HD_{0X}$, $HD_{0Y}$ via multiplier blocks 2421 and 2422, respectively, are subtracted from the signal 2415 via adder blocks 2423 and 2424. The resultant signals 2425 and 2426, which represent four pairs of 4D signal samples, are provided to the multiplexer block 2430 which is identical to multiplexer block 2011 (FIG. 20). The multiplexer block 2430, which includes 4 multiplexers, selects four 4D signal samples from the inputted four pairs of 4D signal samples and outputs to four multiplexers. The four multiplexers correspond to states 0, 1, 2, 3, respectively. In FIG. 24, only multiplexer 2440 corresponding to state 0 is shown.

It is understood that the connections from the multiplexer blocks 2430-2437 to the multiplexers 2440-2447 are in accordance with the trellis diagram of FIG. 5.

The outputs, associated with trellis state 0, from multiplexer blocks 2430, 2432, 2434, 2436 are inputted to the multiplexer 2440. The multiplexer 2440 selects one of these four values based on the select signal $S_0$. The selected signal is delayed by one time period via register 2450. The output of the register 2450 is provided to the Viterbi decoder 1904 (FIG. 19) as the Viterbi input $SD_0$ for trellis state 0.

To avoid a wiring problem in the circuit layout, the slicer blocks 2001-2008 in the Viterbi decoder (FIG. 20) can be duplicated as slicer blocks 2460-2467 to be part of the embodiment 2400 of the MDFE 1902 (FIG. 9). The outputs {$HD_{iX}$, $HD_{iY}$, with i=0, ..., 7} of the slicer blocks 2460-2467 are fed back to the multipliers that are used for computing the ISI estimates associated with the DFE coefficient $C_0$ (e.g., multipliers 2421 and 2422).

The embodiment 2400 of the MDFE alleviates the timing contention between the MDFE and the Viterbi decoder by using look-ahead computations. In symbol period 0, the Viterbi decoder performs the 4D slicing functions, generating in the process the intermediate 4D decisions {$HD_{iX}$, $HD_{iY}$, with i=0, ..., 7}, the select signals $SX_i$ and path select signals $S_i$, i=0, ..., 7, to update the path memory. In the same symbol period 0, the MDFE 2400 utilizes $V_{0i}$, i=0, ..., 7, and the intermediate 4D decisions {$HD_{iX}$, $HD_{iY}$, with i=0, ..., 7} to compute all the possible values for the next-cycle (i.e., the next symbol period) Viterbi inputs $SD_i$, i=0, ..., 7, then uses the select signals $SX_i$ and $S_i$, i=0, ..., 7, to select the appropriate Viterbi inputs from the computed possible values. These appropriate Viterbi inputs are loaded into the registers 2450-2457, then outputted from the registers 2450-2457 as the Viterbi inputs $SD_i$, i=0, ..., 7, at the start of symbol period 1.

Thus, by using look-ahead computations, the MDFE 2400 does not have to wait for the tentative decisions from the path memory to compute the next-cycle Viterbi inputs, and can have the next-cycle Viterbi inputs ready for the Viterbi decoder right at the start of the next symbol period. Therefore, the timing bottleneck between the Viterbi decoder and the MDFE is greatly reduced.

FIG. 25 is a simplified diagram of another embodiment of the MDFE 1902 (FIG. 19). This embodiment 2500 differs from the embodiment 2400 in that the slicer blocks associated with the Viterbi decoder are now an integral part of the MDFE 1902. In the embodiment 2500, the inputs from the MDFE 1902 to the Viterbi decoder 1904 are no longer input signal samples that would need to be sliced, but are intermediate 4D decisions. The Viterbi decoder 1904 associated with the embodiment 2500 does not include slicer blocks 2001-2008 (FIG. 20), but includes only the multiplexers 2011-2018 to select the 4D decisions from the intermediate 4D decisions which are received directly from the embodiment 2500 of the MDFE 1902.

Referring to FIG. 25, the tail signal 1908 is provided by the DFE 1912 (FIG. 19). The ISI tail signal 1908 represents a partial ISI component associated with taps 5 through the last tap (tap 32 in one embodiment) of the DFE 1912. The generation of the tail signal 1908 will be described in connection with FIG. 26. The tail signal 1908 is subtracted from the deskew signal 37 to produce the signal 2502 which, in effect, is a partially ISI compensated signal sample. The DFE coefficient $C_4$ is multiplied by the tentative decision $V_{1F}$, previously described in connection with FIG. 14, to produce an estimate of the ISI component associated with tap 4 of the DFE 1912. This ISI estimate associated with $C_4$ is then subtracted from the signal 2502 to produce the signal 2504. The DFE coefficient $C_4$ is multiplied by the tentative decision $V_{0F}$, previously described in connection with FIG. 14, to produce an estimate of the ISI component associated with tap 3 of the DFE 1912. This ISI estimate associated with $C_3$ is then subtracted from the signal 2504 to produce the signal 2506. The DFE coefficient $C_2$ is multiplied by the tentative decision $V'_{0F}$, which is a one-symbol-period earlier version of $V_{0F}$, to produce an estimate of the ISI component associated with tap 2 of the DFE 1912. This ISI estimate associated with $C_2$ is then subtracted from the signal 2506 to produce the signal 2508. The signal 2508 is delayed by one time period to produce the signal 2510. Thus, the signal 2510 is a signal sample from which a partial ISI component associated with taps 2 through the last tap (tap 32 in one embodiment) of the DFE 1912 has been subtracted.

The DFE coefficient $C_1$ is multiplied by each value in the set {$V_{00}$, $V_{01}$, $V_{02}$, ..., $V_{07}$} to form all possible ISI estimates associated with $C_1$. The values $V_{00}$, $V_{01}$, $V_{02}$, ..., $V_{07}$ are outputs of the registers 2031-2038 (FIG. 20). As previously discussed, $V_{00}$, $V_{01}$, $V_{02}$, ..., $V_{07}$ can be used instead of $V'_{1i}$, i=0, ..., 7, in the multiplication by the coefficient $C_1$ in the MDFE 1902 as long as the selection process based on the path select signal $S_i$, i=0, ..., 7, that is used to derive $V'_{1i}$, i=1, ..., 7, from $V_{00}$, $V_{01}$, $V_{02}$, ..., $V_{07}$ is subsequently provided.

The possible ISI estimates associated with $C_1$ are then subtracted from the signal 2510. For example, the ISI estimate formed by multiplying $C_1$ with $V_{00}$ via multiplier 2511 is subtracted from the signal 2510 via adder 2514 to form the signal 2515. It is understood that similar operations are performed on the other seven ISI estimates associated with $C_1$.

The DFE coefficient $C_0$ is multiplied by each value in the set {$HD_{iX}$, $HD_{iY}$, with i=0, ..., 7} to form all possible ISI estimates associated with $C_0$. The values {$HD_{iX}$, $HD_{iY}$, with i=0, ..., 7} are intermediate 4D decisions and are fed back from the outputs of the MDFE 2500. The values {$HD_{iX}$, $HD_{iY}$, with i=0, ..., 7} correspond to the intermediate 4D decisions that would be obtained by slicing $SD_i$, i=0, ..., 7, via the slicer blocks 2001-2018 (FIG. 20). It is noted that each {$HD_{iX}$, $HD_{iY}$} represents four pairs of intermediate 4D decisions. As previously discussed, these intermediate 4D decisions which correspond to results obtained from slicing $SD_0$-$SD_7$ can be used instead of $V'_{0i}$, i=0, ..., 7, in the multiplication by the coefficient $C_0$ in the MDFE 1902 as long as the two selection processes that are used to derive $V'_{0i}$, i=1, ..., 7, from the intermediate 4D decisions {$HD_{iX}$, $HD_{iY}$, with i=0, ..., 7} are subsequently provided. The first selection process is based on the select signals $SX_i$, i=0, ..., 7. The second selection process is based on the path select signal $S_i$, i=0, ..., 7.

The processing of all the possible ISI estimates associated with $C_0$ is similar for all the 8 pairs of branches. Only one pair of branches will be described in detail. This description is applicable to the other pairs of branches.

The ISI estimates that are formed by multiplying $C_0$ with $HD_{0X}$, $HD_{0Y}$ via multiplier blocks 2521 and 2522, respectively, are subtracted from the signal 2515 via adder blocks 2523 and 2524. The resultant signals 2525 and 2526, which represent four pairs of 4D signal samples, are provided to slicer blocks 2527 and 2528. The slicer blocks 2527, 2528 correspond to the first and second sub-subsets, respectively, of the code-subsets S0, S2, S4, S6 (FIG. 4B). Each of the slicer blocks 2527, 2528 generates four 4D decisions corresponding to the respective sub-subsets of the code-subsets S0, S2, S4, S6.

The outputs of the slicer blocks 2527, 2528 are provided to the multiplexer block 2530 which is identical to multiplexer block 2011 (FIG. 20). The multiplexer block 2530, which includes 4 multiplexers, selects four 4D signal samples from the inputted four pairs of 4D signal samples and outputs to four multiplexers. These four multiplexers correspond to states 0, 1, 2, 3, respectively. In FIG. 25, only multiplexer 2540 corresponding to state 0 is shown.

It is understood that the connections from the multiplexer blocks 2530-2537 to the multiplexers 2540-2547 are in accordance with the trellis diagram of FIG. 5. For clarity and simplicity, only partial connections are illustrated.

The outputs, associated with trellis state 0, from multiplexer blocks 2530, 2532, 2534, 2536 are inputted to the multiplexer 2540. The multiplexer 2540 selects one of these four values based on the select signal $S_0$. The selected signal is delayed by one time period via register 2550. The output $\{HD_{0X}, HO_{0Y}\}$ of the register 2550 is provided to the multiplexer block 2011 of the Viterbi decoder (FIG. 20) as the intermediate 4D decisions for trellis state 0.

The embodiment 2500 of the MDFE alleviates the timing contention between the MDFE and the Viterbi decoder by using look-ahead computations. In symbol period 0, the Viterbi decoder uses the intermediate 4D decisions $\{HD_{iX}, HD_{iY},$ with $i=0, \ldots, 7\}$ received from the MDFE 2500, the select signals $SX_i$ and path select signals $S_i$, $i=0, \ldots, 7$, to compute the 4D decisions and to update the path memory. In the same symbol period 0, the MDFE 2500 utilizes $V_{0i}$, $i=0, \ldots, 7$, the intermediate 4D decisions $\{HD_{iX}, HD_{iY}, \text{with } i=0, \ldots, 7\}$, and slicing functions to compute all the possible values for the next-cycle (i.e., the next symbol period) Viterbi inputs $\{HD_{iX}, HD_{iY}, \text{with } i=0, \ldots, 7\}$, then uses the select signals $SX_i$ and $S_i$, $i=0, \ldots, 7$, to select appropriate Viterbi inputs from the computed possible values. These selected Viterbi inputs are loaded into the registers 2550-2557, then outputted from the registers 2550-2557 as the Viterbi inputs $\{HD_{iX}, HD_{iY}, \text{with } i=0, \ldots, 7\}$ at the start of the next symbol period.

It is noted that, in the systems 2400 (FIG. 24) and 2500 (FIG. 25) described above, the ISI tail signal 2101 (FIG. 15 and FIG. 23) can be used instead of the ISI tail signal 1908 and $C_4$ and $C_3$. The reason for using the ISI tail signal 1908 and piping $C_4$ and $C_3$ out of the DFE 1912 will be discussed below in conjunction with FIG. 26.

FIG. 26 is a detailed diagram of an exemplary structure of the DFE 1912. The structure 2600 is almost identical to the structure 612 shown in FIG. 15. The difference is in the location, thus, the composition, of the ISI tail signal. In FIG. 15, the ISI tail signal 2101 corresponds to the ISI component associated with taps 3 through 32. In FIG. 26, the ISI tail signal 1908 corresponds to the ISI component associated with taps 5 through 32. To obtain a complete ISI estimate associated with the DFE coefficients $C_0$ through $C_{32}$, in addition to the ISI tail signal, the remaining coefficients must be piped out from the DFE for further processing. Using the ISI tail signal 2101 (FIG. 15) requires piping out of the coefficient values $C_2, C_1, C_0$, while using the ISI tail signal 1908 (FIG. 26) requires piping out of the coefficient values $C_4, C_3, C_2, C_1, C_0$. The advantage of using the ISI tail signal 1908 and piping out more coefficient values for processing outside of the DFE is that higher processing speed can be achieved. This is due to the fact that the DFE is usually running at lower voltage, hence, at lower speed, than the outside circuitry, such as the MDFE.

In general, an ISI tail signal associated with the coefficients $C_i$, $i=K, \ldots, M$, can be used as long as the remaining coefficients $C_j$, $j=0, \ldots, K-1$, are piped out and processed outside of the DFE so as to provide the remaining ISI components associated with $C_j$, $j=0, \ldots, K-1$.

It will be evident to one having skill in the art that although the transceiver has been described in the context of a trellis encoded, PAM-5 signal representation, communicated over a multi-pair transmission channel, the invention is not limited to any particular communication technique. Specifically, the decoder architecture and signal processing methodology in accord with the invention is suitable for use with any form of communication in which the symbolic content of the communication is represented by multi-level signals. The invention, indeed, becomes particularly appropriate as the number of signal levels increases.

Neither is the invention limited to signals encoded in accordance with a 4D, eight-state, trellis methodology. Trellis encoding forces the system to be constructed so as to accommodate the eight states inherent in the trellis methodology. Other coding methodologies and architectures are expressly contemplated by the invention and can be implemented by making the proper modifications to an alternative coding architecture's "state width", as will be apparent to a skilled integrated circuit transceiver designer. Likewise, the "dimensional depth", 1D, 2D, 4D . . . for example, may be suitably increased, or decreased to accommodate different forms of transmission channel implementations. As in the case of increasing signal level representations, the systems and methods of the invention are particularly suitable for channels with increased "depth", such as six, eight, or even higher numbers, of twisted pair cabling, single conductor cabling, parallel wireless channels, and the like.

While certain exemplary embodiments have been described in detail and shown in the accompanying drawings, it is to be understood that such embodiments are merely illustrative of and not restrictive on the broad invention. It will thus be recognized that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and spirit of the invention as defined by the appended claims.

What is claimed is:

1. An apparatus comprising:
    a plurality of channel processors, wherein each channel processor comprises:
        a decision device operable to generate a decision value based at least in part on a compensated signal, wherein the decision value is one of a plurality of decision values and the compensated signal is one of a plurality of compensated signals;
        a decision feedback equalizer operable to generate a correction value based at least in part on the decision value; and
        a subtractor operable to subtract the correction value and a cancellation value from a received signal to generate a compensated signal, wherein the cancellation value is one of plurality of cancellation values; and
    a multiple-channel processor operable to generate the plurality of cancellation values based at least in part on the plurality of compensated signals and the plurality of decision values.

2. The apparatus of claim 1 wherein each decision device comprises a trellis decoder.

3. The apparatus of claim 1 wherein each decision device comprises a Viterbi decoder.

4. The apparatus of claim 1 wherein the decision values on which the correction values are based are tentative decisions.

5. The apparatus of claim 1 wherein the cancellation values comprise crosstalk cancellation values.

6. The apparatus of claim 1 wherein the decision feedback equalizer comprises a filter having a plurality of coefficients corresponding to a plurality of taps.

* * * * *